(12) United States Patent
Bocko et al.

(10) Patent No.: US 8,211,505 B2
(45) Date of Patent: Jul. 3, 2012

(54) HIGH-STRENGTH LAMINATED SHEET FOR OPTICAL APPLICATIONS

(75) Inventors: Peter L. Bocko, Painted Post, NY (US); David Chen, Taipei (TW); Glen B. Cook, Corning, NY (US); Frank T. Coppola, Elmira, NY (US); Victoria A. Edwards, Horseheads, NY (US); Gunilla E. Gillberg, Painted Post, NY (US); Josef C. Lapp, Corning, NY (US); Randy L. Rhoads, Horseheads, NY (US); David A. Tammaro, Painted Post, NY (US); Butchi R. Vaddi, Sayre, PA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/392,580

(22) Filed: Feb. 25, 2009

(65) Prior Publication Data
US 2009/0162545 A1 Jun. 25, 2009

Related U.S. Application Data

(62) Division of application No. 10/406,965, filed on Apr. 4, 2003, now Pat. No. 7,514,149.

(51) Int. Cl.
| | | |
|---|---|---|
| B05D 1/30 | (2006.01) |
| C03B 9/00 | (2006.01) |
| C03B 11/00 | (2006.01) |
| C03B 13/00 | (2006.01) |
| C03B 15/00 | (2006.01) |
| C03B 17/00 | (2006.01) |
| C03B 18/00 | (2006.01) |
| C03B 19/00 | (2006.01) |
| C03B 25/00 | (2006.01) |
| C03B 27/00 | (2006.01) |
| C03B 15/02 | (2006.01) |

(52) U.S. Cl. ............... 427/420; 65/53; 65/90; 65/99.1; 65/193; 65/195

(58) Field of Classification Search ............... 427/420; 65/53, 90, 99.1, 193, 195
See application file for complete search history.

(56) References Cited

U.S. PATENT DOCUMENTS
| | | | | |
|---|---|---|---|---|
| 1,641,932 A | * | 9/1927 | Reece | ............... 65/50 |
| 1,731,260 A | | 10/1929 | Nobbe | |
| 1,805,260 A | * | 5/1931 | Reece | ............... 65/149 |
| 1,829,641 A | | 10/1931 | Ferngren | |

(Continued)

FOREIGN PATENT DOCUMENTS
EP 0 945 254 9/1999

OTHER PUBLICATIONS

Elastic Properties and Young Modulus for some Materials; http://www.engineeringtoolbox.com/young-modulus-d_417.html.*

(Continued)

*Primary Examiner* — Michael Cleveland
*Assistant Examiner* — James M Mellott
(74) *Attorney, Agent, or Firm* — Thomas R. Beall

(57) ABSTRACT

A laminated sheet includes a surface layer having an optical surface that is of fire-polished quality and a core layer having a higher modulus than the surface layer to increase an overall stiffness or fracture toughness of the laminated sheet.

8 Claims, 24 Drawing Sheets

U.S. PATENT DOCUMENTS

| | | | | |
|---|---|---|---|---|
| 1,980,970 A | | 11/1934 | Monro | 49/92 |
| 2,733,167 A | | 1/1956 | Stookey | 427/229 |
| 3,149,949 A | | 9/1964 | Dockerty | 65/53 |
| 3,256,081 A | * | 6/1966 | Peyches et al. | 65/184 |
| 3,338,696 A | | 8/1967 | Dockerty | 65/145 |
| 3,382,137 A | | 5/1968 | Schreiber et al. | 161/185 |
| 3,391,053 A | * | 7/1968 | Kolb | 428/215 |
| 3,451,847 A | * | 6/1969 | Ashpole et al. | 427/592 |
| 3,471,356 A | | 10/1969 | Kolb et al. | 161/160 |
| 3,574,030 A | | 4/1971 | Callander et al. | 156/244 |
| 3,682,609 A | | 8/1972 | Dockerty | 65/83 |
| 3,737,294 A | | 6/1973 | Dumbaugh et al. | 65/33 |
| 3,997,314 A | * | 12/1976 | Ono et al. | 65/51 |
| 4,102,664 A | | 7/1978 | Dumbaugh, Jr. | 65/23 |
| 4,203,750 A | | 5/1980 | Shay | 65/99 |
| 4,204,027 A | * | 5/1980 | Simon | 428/428 |
| 4,214,886 A | * | 7/1980 | Shay et al. | 65/121 |
| 4,224,074 A | | 9/1980 | Reade | 501/25 |
| 4,242,412 A | | 12/1980 | Funaki et al. | 428/412 |
| 4,332,859 A | | 6/1982 | Funaki et al. | 428/412 |
| 4,414,254 A | | 11/1983 | Iwata et al. | 428/34 |
| 4,460,665 A | | 7/1984 | Kunikane et al. | 428/199 |
| 4,517,243 A | | 5/1985 | Sinha et al. | 428/336 |
| 4,590,103 A | | 5/1986 | Ahne et al. | 427/387 |
| 4,590,171 A | | 5/1986 | Nigrin | 501/25 |
| 4,592,947 A | | 6/1986 | Hunter et al. | 428/212 |
| 4,702,963 A | | 10/1987 | Phillips et al. | 428/426 |
| 4,705,360 A | | 11/1987 | Funada et al. | 350/344 |
| 4,880,453 A | | 11/1989 | Coppola et al. | 65/23 |
| 4,901,074 A | | 2/1990 | Sinn et al. | 341/22 |
| 4,937,129 A | | 6/1990 | Yamazaki | 428/195 |
| 4,946,827 A | | 8/1990 | Harrison et al. | 503/227 |
| 4,973,511 A | | 11/1990 | Farmer et al. | 428/216 |
| 4,977,013 A | | 12/1990 | Ritchie | 428/212 |
| 4,977,028 A | | 12/1990 | Goepfert et al. | 428/426 |
| 5,013,607 A | | 5/1991 | Soto et al. | 428/426 |
| 5,017,433 A | | 5/1991 | Chevreux et al. | 428/425.6 |
| 5,075,172 A | | 12/1991 | Dixon et al. | 428/422 |
| 5,100,523 A | | 3/1992 | Helms et al. | 204/290 |
| 5,128,013 A | | 7/1992 | Helms | 204/290 |
| 5,147,719 A | | 9/1992 | Herd et al. | 428/332 |
| 5,151,379 A | | 9/1992 | Suginoya et al. | 427/39 |
| 5,190,794 A | | 3/1993 | Yoshino et al. | 427/162 |
| 5,198,267 A | | 3/1993 | Aharoni et al. | 427/162 |
| 5,229,433 A | | 7/1993 | Schunck et al. | 522/96 |
| 5,256,463 A | | 10/1993 | Osaka et al. | 428/77 |
| 5,264,286 A | | 11/1993 | Ando et al. | 428/432 |
| 5,281,450 A | | 1/1994 | Yaniv | 427/510 |
| 5,296,296 A | | 3/1994 | Haghighat et al. | 428/426 |
| 5,298,312 A | | 3/1994 | Oyama et al. | 428/216 |
| 5,342,426 A | | 8/1994 | Dumbaugh, Jr. | 65/23 |
| 5,346,770 A | | 9/1994 | Osada et al. | 428/432 |
| 5,413,863 A | | 5/1995 | Weber et al. | 428/428 |
| 5,443,869 A | | 8/1995 | Harris | 428/13 |
| 5,501,910 A | | 3/1996 | Smith | 428/447 |
| 5,544,582 A | | 8/1996 | Bocko et al. | 101/211 |
| 5,549,929 A | | 8/1996 | Scheibelhoffer et al. | 427/282 |
| 5,552,192 A | | 9/1996 | Kashiwazaki et al. | 427/492 |
| 5,556,709 A | | 9/1996 | Kato et al. | 428/426 |
| 5,558,904 A | | 9/1996 | Hsieh et al. | 427/66 |
| 5,576,070 A | | 11/1996 | Yaniv | 427/510 |
| 5,582,761 A | | 12/1996 | Bloch et al. | 508/307 |
| 5,582,916 A | | 12/1996 | Ohtsu et al. | 428/412 |
| 5,639,511 A | | 6/1997 | Watanabe et al. | 427/162 |
| 5,650,233 A | | 7/1997 | Miyake et al. | 428/441 |
| 5,667,888 A | | 9/1997 | Yoshida et al. | 428/336 |
| 5,668,666 A | | 9/1997 | Suzuki | 359/674 |
| 5,672,678 A | | 9/1997 | Holmes et al. | 528/373 |
| 5,681,666 A | | 10/1997 | Treger et al. | 429/90 |
| 5,701,815 A | | 12/1997 | Bocko et al. | 101/211 |
| 5,705,220 A | | 1/1998 | Cnossen et al. | 427/164 |
| 5,716,740 A | | 2/1998 | Shiba et al. | 430/7 |
| 5,731,044 A | | 3/1998 | Hirota et al. | 427/512 |
| 5,750,264 A | | 5/1998 | Ueno et al. | 428/426 |
| 5,763,062 A | | 6/1998 | Smith et al. | 428/215 |
| 5,773,150 A | | 6/1998 | Tong et al. | 428/429 |
| 5,792,559 A | | 8/1998 | Heithoff et al. | 428/437 |
| 5,852,126 A | | 12/1998 | Barnard et al. | 525/326.3 |
| 5,853,796 A | | 12/1998 | Kim et al. | 427/64 |
| 5,902,648 A | | 5/1999 | Naka et al. | 427/558 |
| 5,916,632 A | | 6/1999 | Mishina et al. | 427/240 |
| 5,922,401 A | | 7/1999 | Kashiwazaki et al. | 427/164 |
| 5,942,319 A | | 8/1999 | Oyama et al. | 428/216 |
| 5,948,487 A | | 9/1999 | Sahouani et al. | 428/1 |
| 5,958,596 A | | 9/1999 | Claussen et al. | 428/426 |
| 5,962,114 A | | 10/1999 | Jonza et al. | 428/212 |
| 5,965,209 A | | 10/1999 | Komatsu et al. | 427/430.1 |
| 5,972,544 A | | 10/1999 | Carr et al. | 430/7 |
| 5,972,545 A | | 10/1999 | Eid et al. | 430/7 |
| 6,030,708 A | | 2/2000 | Ishibashi et al. | 428/441 |
| 6,042,947 A | | 3/2000 | Asakura et al. | 428/437 |
| 6,051,290 A | | 4/2000 | Sahouani et al. | 428/1.1 |
| RE36,711 E | | 5/2000 | Yaniv | 427/510 |
| 6,060,001 A | | 5/2000 | Welch et al. | 252/586 |
| 6,066,357 A | | 5/2000 | Tang et al. | 427/66 |
| 6,077,613 A | | 6/2000 | Gaffigan | 428/442 |
| 6,114,046 A | | 9/2000 | Hanoka | 428/515 |
| 6,177,153 B1 | | 1/2001 | Uchiyama et al. | 428/1.1 |
| 6,180,245 B1 | | 1/2001 | Janssen et al. | 428/426 |
| 6,183,829 B1 | | 2/2001 | Daecher et al. | 428/64.1 |
| 6,187,448 B1 | | 2/2001 | Hanoka et al. | 428/515 |
| 6,188,174 B1 | | 2/2001 | Marutsuka | 313/479 |
| 6,216,491 B1 | | 4/2001 | Fehlner | 65/25.3 |
| 6,224,976 B1 | | 5/2001 | Takushima et al. | 428/355 |
| 6,235,398 B1 | | 5/2001 | Nakamura et al. | 428/432 |
| 6,268,058 B1 | | 7/2001 | Tahon et al. | 428/426 |
| 6,268,231 B1 | | 7/2001 | Wetzel | 438/48 |
| 6,270,903 B1 | | 8/2001 | Fang et al. | 428/429 |
| 6,287,674 B1 | | 9/2001 | Verlinden et al. | 428/210 |
| 6,379,746 B1 | | 4/2002 | Birch et al. | 427/154 |
| 2001/0039814 A1 | | 11/2001 | Pitbladdo | 65/193 |

OTHER PUBLICATIONS

Northwest Foam Products, Inc. Spec Sheet; http://www.northwestfoam.com/fact-specs.htm.*

Elastic Properties and Young Modulus for some Materials (Elastic Properties and Young Modulus for some Materials, http://www.engineeringtoolbox.com/young-modulus-d_417.html.*

Ashby, M., Materials Selection in Mechanical Design, 3rd ed., Elsevier, 2005.*

* cited by examiner

— Surface Glass
— Fusion-line Glass
■ ■ ■ ■ ■ Glass Mapping Surface-to-Fusion Line
— — — Glass Mapping Parallel to Surface: Buried Layer

HIGH-STRENGTH LAMINATED SHEET FOR OPTICAL APPLICATIONS

CROSS-REFERENCE TO RELATED APPLICATIONS

This application is a divisional of and claims the benefit of priority to U.S. patent application Ser. No. 10/406,965, now U.S. Pat. No. 7,514,149 filed on Apr. 4, 2003, the content of which is relied upon and incorporated herein by reference in its entirety.

BACKGROUND OF INVENTION

The invention relates generally to substrates, such as those used in manufacturing flat panel displays, and method of making the same.

Display components, e.g., thin film transistors (TFTs), color filters, and organic light emitting diodes (OLEDs), are typically fabricated on glass substrates. Although, glass has desirable optical properties for display and other applications, it is relatively heavy and easily broken.

From the foregoing, there is desired a substrate for applications such as displays, other active electronic devices, and optical device packaging that has a high mechanical strength and low thermal shrinkage.

SUMMARY OF INVENTION

In one aspect, the invention relates to a laminated sheet which comprises a surface layer having an optical surface that is of fire-polished quality and a core layer having a higher modulus than the surface layer to increase an overall stiffness of the laminated sheet.

In another aspect, the invention relates to a laminated sheet which comprises a compressive surface layer having an optical surface that is of fire-polished quality and a core layer, wherein the thermal expansion coefficients of the surface and core layers are adjusted to control stress and enhance fracture toughness of the laminated sheet.

In another aspect, the invention relates to a laminated sheet which comprises a surface layer having an optical surface that is of fire-polished quality, a core layer having a higher modulus than the surface layer to increase an overall stiffness of the laminated sheet, and a sacrificial layer interposed between the surface layer and the core layer.

In another aspect, the invention relates to a laminated sheet which comprises a core layer, a surface layer disposed on a first side of the core layer, the surface layer having an optical surface that is of fire-polished quality, and a bottom layer disposed on a second side of the core layer, wherein the core layer has a higher section modulus than the surface layer and the bottom layer to increase an overall stiffness of the laminated sheet.

In another aspect, the invention relates to a method of making a laminated sheet which comprises supplying a first viscous, flowable material into an overflow channel, overflowing the first viscous, flowable material in a controlled manner to form a first sheet-like flow having at least one untouched surface of fire-polished quality, depositing at least a second material on a surface of the first sheet-like flow to form a laminated flow, and drawing the laminated flow into a laminated sheet.

In another aspect, the invention relates to a method of making a laminated sheet which comprises supplying a viscous, flowable material into an overflow channel, positioning a consumable material in a flow path of the viscous, flowable material so as to introduce a compositional variation to a specific portion of the viscous, flowable material, overflowing the viscous, flowable material in a controlled manner to form a sheet-like flow having at least one untouched surface of fire-polished quality, and drawing the sheet-like flow into a laminated sheet.

In another aspect, the invention relates to a method of making a laminated sheet which comprises forming a first sheet-like flow by a continuous sol-gel process, supplying a viscous, flowable material into an overflow channel, overflowing the viscous, flowable material in a controlled manner to form a second sheet-like flow, fusing the second sheet-like flow with a surface of the first sheet-like flow to form a laminated flow, and drawing the laminated flow into a laminated sheet.

In another aspect, the invention relates to a method of making a laminated sheet which comprises supplying a first and a second viscous, flowable material into independent compartments in an overflow channel, simultaneously overflowing the first and second viscous, flowable materials to form separate flow streams, uniting the separate flow streams into a single sheet-like laminated flow, and drawing the sheet-like laminated flow into a laminated sheet.

In another aspect, the invention relates to a method of making a laminated sheet which comprises drawing a first viscous, flowable material through a slot to form a first sheet-like flow, supplying a second viscous, flowable material into an overflow channel and overflowing the second viscous, flowable material from the overflow channel in a controlled manner to form a second sheet-like flow having an untouched surface of fire-polished quality, merging the second sheet-like flow with a surface of the first sheet-like flow to form a laminated flow, and drawing the laminated flow into a laminated sheet.

In another aspect, the invention relates to a method of making a laminated sheet which comprises supplying a viscous, lowable material into an open channel, simultaneously overflowing the viscous, flowable material from a first side of the open channel and drawing the viscous, flowable material from a second side of the open channel, wherein the viscous, flowable material drawn from the second side of the open channel forms a sheet-like flow, wherein the viscous, flowable material overflowed from the first side of the open channel forms two separate flow streams having untouched surfaces of fire-polished quality, merging each of the flow streams with a surface of the sheet-like flow to form a laminated flow, and drawing the laminated flow into a laminated sheet.

In another aspect, the invention relates to a method of making a laminated sheet which comprises obtaining a sheet of material, supplying a first viscous, flowable material to a first overflow channel, overflowing the first viscous, flowable material in a controlled manner to form a sheet-like flow with an untouched surface of fire-polished quality, and, while the sheet-like flow is in viscous, flowable form, merging the sheet-like flow with a surface of the sheet of material.

In another aspect, the invention relates to a method of making a laminated sheet which comprises supplying a first viscous, flowable material to a first overflow channel and a second viscous, flowable material to a second overflow channel, overflowing the first viscous, flowable material from the first overflow channel in a controlled manner to form a first sheet-like flow with at least one untouched surface of fire-polished quality, wherein the viscous, flowable material drawn from the second side of the open channel forms a sheet-like flow, wherein the viscous, flowable material overflowed from the first side of the open channel forms two separate flow streams having untouched surfaces of fire-polished quality, merging each of the flow streams with a surface of the sheet-like flow to form a laminated flow, drawing the laminated flow into a laminated sheet.

In another aspect, the invention relates to an apparatus for forming a laminated sheet which comprises an overflow means for forming opposed sheet-like flows, wherein the overflow means has at least two independent compartments for receiving a viscous, flowable material, a forming means positioned below the overflow means for converging and uniting the opposed sheet-like flows into a single drawn sheet flow, means for pivotally adjusting the overflow means such that a surface of the overflow channel has a desired tilt angle with respect to the horizontal, and means for delivering a viscous, flowable material into the compartments.

In another aspect, the invention relates to an apparatus for forming a laminated sheet which comprises an overflow channel for forming opposed sheet-like flows from a viscous, flowable material, a slotted channel positioned below the overflow channel for forming a drawn sheet-like flow, and a forming body positioned below the overflow channel for converging and uniting the opposed sheet-like flows with outer surfaces of the drawn sheet-like flow to form a laminated flow. The apparatus further includes means for pivotally adjusting the overflow channel such that a surface of the overflow channel has a desired tilt angle with respect to the horizontal and means for delivering a viscous, flowable material into the overflow channel.

Other features and advantages of the invention will be apparent from the following description and the appended claims.

DETAILED DESCRIPTION

Figure 1:
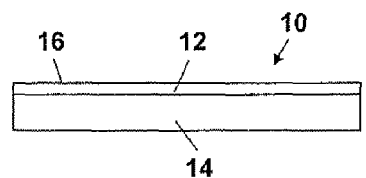
FIG. 1 shows a two-layered laminated sheet according to one embodiment of the invention.

The invention will now, be described in detail with reference to a few preferred embodiments, as illustrated in accompanying drawings. In the following description, numerous specific details are set forth in order to provide a thorough understanding of the invention. It will be apparent, however, to one skilled in the art, that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

The inventors propose herein a substrate that can be used for fabricating displays, especially flat panel displays. The substrate may also be used for other applications benefiting from a surface with high optical flatness, such as active electronic devices, photovoltaic devices, and substrates for biological arrays. In one embodiment, the substrate is a laminated sheet having a surface layer that exhibits optimal properties for enduring direct chemical and thermal interaction with display manufacturing processes and a core layer that has a higher elastic modulus than the surface layer for enhancing the overall mechanical stiffness of the laminated sheet. In one embodiment, the surface layer has a fusion-formed optical surface that is pristine and of fire-polished quality and a uniform thickness and flatness that satisfy display application requirements. In one embodiment, the core layer is separable from the surface layer, leaving a final product, i.e., the surface layer, that is thin and meets display application requirements.

In general, the materials used in forming the layers in the laminated sheet are selected such that the optical, electrical, chemical, and mechanical properties of the laminated sheet are optimized for the target application. For example, the materials can be selected such that the laminated sheet has a low density and is flexible, tough, and transparent. For the fusion-formed layers, the layer-forming materials should have viscoelastic characteristics. Examples of materials exhibiting viscoelastic characteristics are glass and polymer. The laminated sheet may be made of multiple materials with different elastic moduli, which could include, but are not limited to, glasses and polymers and/or their precursors such as curable monomers and oligomers, or multiple polymers, or glasses, including low-melting glasses, glass-ceramics, nanocomposites, and any combination thereof. The laminated sheet may include additional layers besides the surface layer and the higher modulus core layer. For example, the laminated sheet may include interlayers with thermal expansion coefficients tailored to manage residual stress upon cooling. As another example, should the outermost surface layer require additional optical functionality, the pristine, fire-polished quality need not be maintained. For example, one of ordinary skill in the art will recognize that optically functional layers, such as microlens arrays or polarizers, could be added to any of the laminated sheets described herein. One of ordinary skill in the art will also recognize that the laminated sheet with fire-polished surface quality could also be achieved with a redraw-type process, for example, redrawing of a slot-drawn laminated sheet.

Specific laminated sheet structures will now be described with reference to the accompanying drawings.

Two-Layered Laminated Sheet

FIG. 1 shows a two-layered laminated sheet 10 having a surface layer 12 and a core layer 14. The surface layer 12 and the core layer 14 may be single layers, as illustrated in the figure, or may be made of sub-layers. The surface layer 12 has a fusion-formed optical surface 16 that can serve as a basis for fabricating functional elements (not shown), such as, but not limited to, TFTs, OLEDs, or color filters. The fusion-formed optical surface 16 is untouched by a forming device, e.g., uncontaminated by refractory material, and has a fire-polished surface quality. The surface layer 12 has a uniform thickness and a flatness that meet display application requirements. The core layer 14 has a higher elastic modulus than the surface layer 12 and provides mechanical support to the surface layer 12 such that the structural integrity of the laminated sheet 10 is maintained while packaging and fabricating functional elements (not shown) on the surface layer 12.

Preferably, the outer extent of the core layer 14 is placed as far as possible from the neutral axis of the thickness of the laminated sheet 10. This is because the section modulus of the laminated sheet 10 depends on the square of the distance of the higher modulus layer 14 from the neutral axis. Thus, the farther away the outer extent of the core layer 14 is from the neutral axis of the thickness of the laminated sheet, the higher the section modulus and the mechanical stiffness of the laminated sheet 10.

In one embodiment, the surface and core layers 12, 14 are made of glasses and/or polymers or glasses and/or glass-ceramics. Examples of glasses include, but are not limited to, alkaline-earth boro-aluminosilicate, zinc borosilicate, and soda-lime glass. Examples of polymers include, but are not limited to, poly perfluorocyclobutane ether, polycyclic olefin, polyamide, polyether-sulfone (PES), polyarylate, polycarbonate, poly ethylene terphthalate (PET), poly ethylene naphthalate (PEN), poly methyl methacrylate (PMMA), and poly vinyl butyral (PVB). Examples of glass-ceramics include, but are not limited to, glasses enriched with magnesium oxide, yttria, berylia, alumina, or zirconia.

Preferably, the materials used in forming the surface and core layers 12, 14 are transparent. The type of materials used in forming the surface and core layers 12, 14 can be the same or can be different. For example, the surface and core layers 12, 14 may both be made of glass or of polymer. Alternatively, the surface layer 12 may be made of glass and the core layer 14 of polymer, and vice-versa. Alternatively, the surface layer 12 may be made of glass and the core layer 14 made of glass-ceramic. Typically, the layer-forming materials are selected based on the display application requirements. For example, display applications involving fabrication of low-temperature poly-silicon (LTPS) TFTs typically require a substrate that has a high strain point, e.g., greater than 600° C., in order to minimize shrinking and/or warping when the substrate is heated. These applications also generally require a substrate having a thermal behavior that is similar to that of silicon.

In general, the materials used in forming the surface and core layers 12, 14 will be selected to achieve a desired thermal expansion behavior when the laminated sheet 10 is heated. Of particular interest in display applications is to select the materials such that the overall shrinkage of the laminated sheet 10 due to heating is negligible. The layer-forming materials may also be selected to achieve low density, flexibility, toughness, transparency, and, possibly, low permeation to moisture and gas. The optical properties of the surface layer 12 can be optimized for the target application, while the mechanical properties of the core layer 14 can be optimized to achieve, for example, a desired toughness and flexibility.

In one embodiment, the core layer 14 is separable from the surface layer 12 by means such as thermal, chemical, mechanical, electromagnetic radiation, or other means. In one embodiment, separation of the core layer 14 from the surface layer 12 is achieved by selecting the material used in forming the core layer 14 to be more soluble in an appropriate solvent than the material used in forming the surface layer 12. The advantages of making the core layer 14 separable from the surface layer 12 are significant. The surface layer 12 can be made as thin as necessary to meet display application requirements, e.g., thinner than 1 mm. During handling and packaging of the laminated sheet 10 and fabrication of functional elements on the surface layer 12, the core layer 14 would provide the required mechanical support to the surface layer 12. After adding function to the surface layer 12, the core layer 14 can then be separated from the surface layer 12, leaving the thin surface layer 12 that meets display application requirements.

When the core layer 14 is separable from the surface layer 12, there is a wider latitude in selecting the material used in the core layer 14, i.e., the core layer 14 does not have to satisfy the stringent requirements required for display applications since it will not be a part of the final product. Thus, for example, the core layer 14 may be made of a cheap glass or polymer or glass-ceramic that provides the desired mechanical stiffness to the surface layer 12. The core layer 14 may also be made of a material that has a low thermal shrinkage, e.g., a well-annealed glass. Alternatively, the core layer 14 may be made of a material that can be expanded to achieve zero thermal shrinkage, e.g., a foam material such as polystyrene. The core layer 14 can be made as thick as necessary to provide the necessary mechanical support to the surface layer 12 and does not need to have a fusion-formed optical surface that is pristine and of fire-polished quality.

Figure 2:
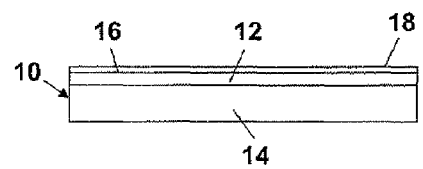
FIG. 2 shows a coating layer added to the laminated sheet of FIG. 1.

One or more layers of coatings can be added to the laminated sheet 10. For example, FIG. 2 shows a coating layer 18 formed on the optical surface 16 of the laminated sheet 10. The coating layer 18 could be made of a metal, semiconducting, or nonmetallic organic or inorganic material. In one embodiment, the coating layer 18 could act as a barrier to the environment, e.g., act to reduce gas and moisture permeation. A protective coating (not shown) may also be added to the core layer 14. Other types of coating may also be added to the laminated sheet 10, such as an optical coating, which will enhance the optical properties of the surface layer 12 and/or core layer 14, or a conductive coating, which can be used as a basis for fabricating active electronic devices, such as electrodes, diodes, or transistors, or a dark or dark color coating that can enhance the contrast of the display, or a reflective metal coating that can enhance the brightness of the display, etc.

Three-Layered Laminated Sheet

Figure 3:
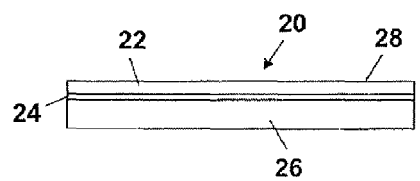
FIG. 3 shows a three-layered laminated sheet according to another embodiment of the invention.

FIG. 3 shows a three-layered laminated sheet 20 which includes a surface layer 22, a sacrificial interlayer 24, and a core layer 26. The surface layer 22 and the core layer 26 may be single layers, as illustrated in the figure, or may be made of sub-layers. The surface layer 22 has a fusion-formed optical surface 28 that can serve as a basis for fabricating active and passive electronic devices. The fusion-formed optical surface 28 is untouched by a forming device, e.g., uncontaminated by refractory material, and has a fire-polished surface quality. The core layer 26 has a higher elastic modulus than the surface layer 22 and provides mechanical support to the surface layer 22, as previously described above. Much of the discussions above concerning materials to use in the two-layered laminated sheet (10 in FIGS. 1 and 2) also apply to the three-layered laminated sheet 20.

The sacrificial interlayer 24 couples the surface layer 22 to the core layer 26 and may be removed so as to allow the surface layer 22 to be separated from the core layer 26. For example, the sacrificial interlayer 24 may be made of a material that is more soluble in an appropriate solvent than at least the material used in the surface layer 22. In this way, the core layer 26 can be separated from the surface layer 22 by dissolving the sacrificial interlayer 24 away. The advantage of this embodiment over the one shown in FIG. 1 is that the sacrificial interlayer 24 can be made very thin so that the amount of material to be dissolved away is very small. In this way, the core layer 26 can be made as thick as necessary to provide the necessary mechanical support to the surface layer 22 while it is coupled to the surface layer 22 through the sacrificial interlayer 24.

Figure 4:
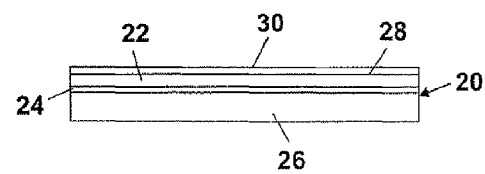
FIG. 4 shows a coating layer added to the laminated sheet of FIG. 3.

One or more layers of coatings may be added to the laminated sheet 20. For example, FIG. 4 shows a coating layer 30 formed on the optical surface 28 of the laminated sheet 20. The coating layer 30 could be made of a metal, semiconducting, or nonmetallic organic or inorganic material. In one embodiment, the coating layer 30 could act as a barrier to the environment, e.g., act to reduce gas and moisture permeation. A protective coating (not shown) may also be added to the core layer 26. Other types of coating may also be added to the laminated sheet 20, such as an optical coating, which will enhance the optical properties of the surface layer 22 and/or core layer 26, or a conductive coating, which can be used as a basis for fabricating active electronic devices, such as electrodes, diodes, or transistors, or a dark or dark color coating that can enhance the contrast of the display, or a reflective metal coating that can enhance the brightness of the display, etc.

Sandwich Laminated Sheet

Figure 5:
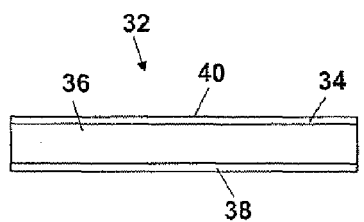
FIG. 5 shows a laminated sheet having a sandwich structure according to another embodiment of the invention.

FIG. 5 shows a laminated sheet 32 having a surface layer 34, a core layer 36, and a bottom layer 38, where the core layer 36 is sandwiched between the surface layer 34 and the bottom layer 38. The surface layer 34, core layer 36, and bottom layer 38 may be single layers, as illustrated in the figure, or may be made of sub-layers. The surface layer 34 has a fusion-formed optical surface 40 that can serve as a basis for fabricating functional elements (not shown), such as TFTs, OLEDs, or color filters. The fusion-formed optical surface 40 is untouched by a forming device, e.g., uncontaminated by refractory material, and has a fire-polished surface quality. The bottom layer 38 is generally non-functional and does not necessarily have to meet the stringent requirements for the surface layer 34. The surface and bottom layers 34, 38 can be made very thin. The core layer 36 can be made much thicker than the surface and bottom layers 34, 38 and may have a higher section modulus than the surface and bottom layers 34, 38 so as to improve the overall structural integrity of the laminated sheet 32. The core layer 36 can be made of a low thermal shrinkage material that will constrain the shrinkage of the laminated sheet 34 while undergoing cyclic thermal history.

Generally speaking, the higher strength of the laminated sheet 32 comes from the surface layer 34 that is resistant to compression, the bottom layer 38 that is resistant to tension, and the core layer 36 that is resistant to shear stress. In one embodiment, the thermal expansion coefficients of the surface layer 34, the core layer 36, and the bottom layer 38 are adjusted to control stress and enhance fracture toughness of the laminated sheet 32. If desired, function can be added to the core layer 36. For example, the core layer 36 can be optically enhanced to enhance the brightness and/or enlarge viewing angle of the display. As described for the two-layered and three-layered laminated sheets above, one or more coating layers (not shown), e.g., protective coating, optical coating, or conductive coating, may be added to the surface layer 34 and/or the bottom layer 38.

Methods for Making Laminated Sheets

The inventors propose herein a method of making a laminated sheet having at least one fusion-formed optical surface that is pristine and of fire-polished quality. The method of the invention can also be used to add one or more layers of coating to the laminated sheet. The coating layer may be protective, e.g., reduce gas and moisture permeation. The coating layer may enhance the optical properties of the substrate, e.g., enhance brightness or enlarge viewing angle. The coating layer may be conductive or have other functional characteristics In general, the methods for making the laminated sheets of the invention start with formation of a sheet of material by a fusion process. In the fusion process, a viscous, flowable material flows into an overflow channel and then overflows in a controlled manner from one side or both sides of the overflow channel, depending on the configuration of the fusion-forming device, to form a sheet-like flow. The other layers of the laminated sheet may be formed by depositing other materials on one or both surfaces of the sheet-like flow. The thickness of the layers are controlled to achieve a laminated sheet having a desired thickness.

The viscous, flowable material(s) used in forming the layers of the laminated sheets may be materials such as, but not limited to, a glass melt or polymer melt. In some embodiments, the viscous, flowable material(s) may be a base glass melt that can, with the addition of one or more elements or oxides, be readily transformed into several specific glasses. The elements or oxides could be nucleating agents for a glass-ceramic, with the base glass being the precursor glass without these agents or with these agents below a critical composition level. The elements or oxides could also be glass components that would cause a significant, controlled change in the resulting elastic modulus of the formed layer.

Recent advances in modeling of the fusion process using computational fluid dynamics make possible the mapping of the precise location in the delivery system of the glass (or polymer) that ultimately ends up at any location in the finished sheet. Thus, elements or oxides can be introduced to the glass melt according to a computer-model-generated map to produce a final fusion drawn sheet having the desired layered structure. The oxides or elements could be introduced, for example, by positioning blocks of consumable (dissolvable) material containing the oxides or elements at specific positions in the fusion pipe to achieve the desired layered structure.

Double-Sided Overflow Fusion Pipe

Figure 6A:
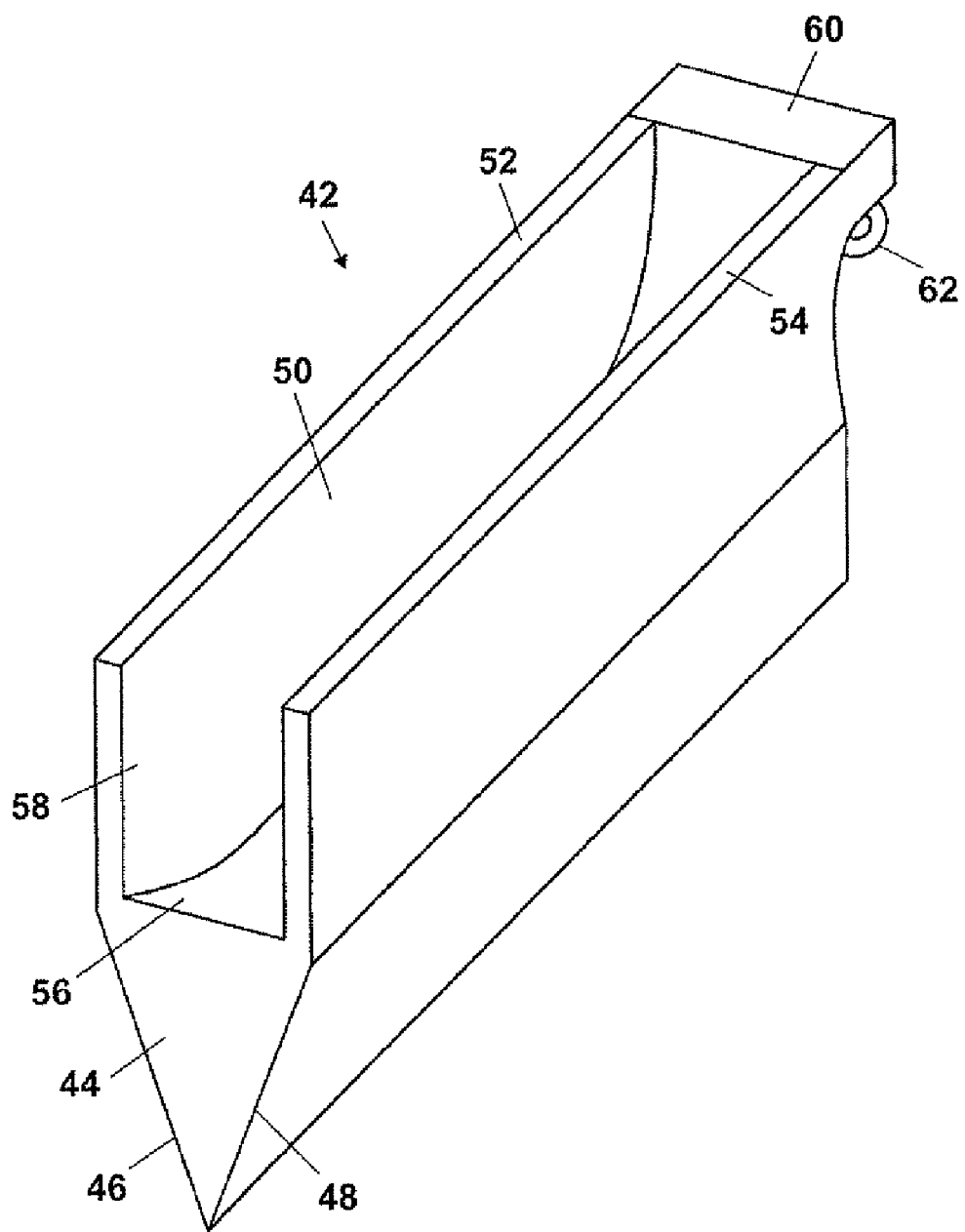
FIG. 6A shows a perspective view of a double-sided overflow fusion pipe.

FIG. 6A shows a double-sided overflow fusion pipe 42 having a wedge-shaped forming body 44 bounded by converging sidewalls 46, 48. An overflow channel 50 is formed in the upper portion of the forming body 44. The overflow channel 50 is bounded by sidewalls (or dams) 52, 54 and a contoured bottom surface 56. The shape of the contoured bottom surface 56 is such that the height of the overflow channel 50 decreases as it extends outwardly from the channel inlet 58 to the dam 60. In operation, a delivery pipe (not shown) would be connected to the channel inlet 58 for delivery of a viscous, flowable material to the overflow channel 50.

The fusion pipe 42 can be pivotally adjusted by any suitable means, such as roller, wedge, or cam 62, such that the upper surfaces of the dams 52, 54 have a desired tilt angle with respect to the horizontal. The tilt angle of the dams 52, 54, the rate at which a viscous, flowable material is supplied to the overflow channel 50, and the viscosity of the flowable material can be selected such that a single sheet-like flow having a uniform thickness is formed.

Figure 6B:
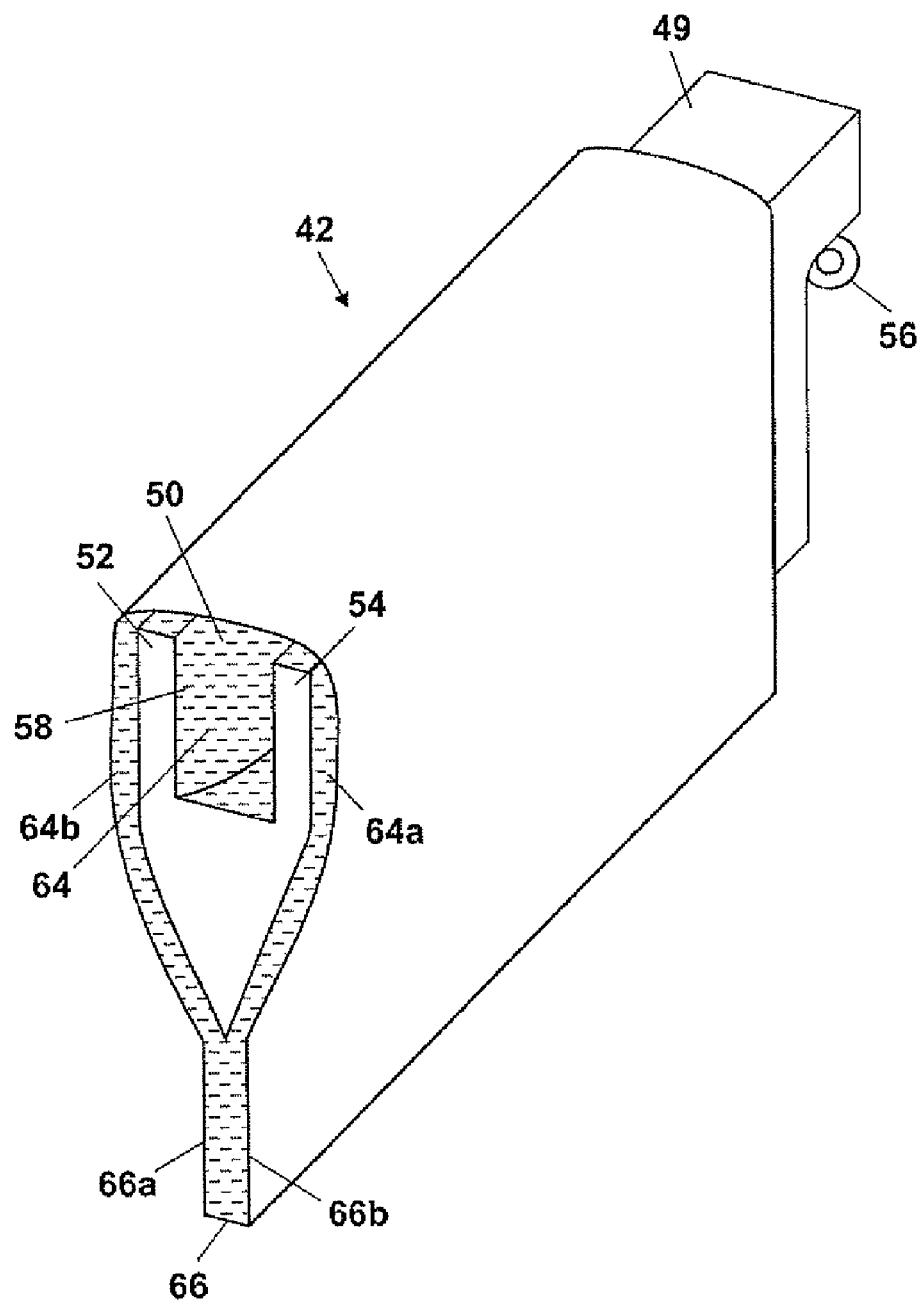
FIG. 6B shows a method for forming a sheet-like flow using the double-sided overflow fusion pipe of FIG. 6A.

In operation, a viscoelastic material, e.g., a glass or polymer material, is blended, melted, and stirred well. As shown in FIG. 6B, the homogeneous flowable viscoelastic material 64 is then delivered to the channel inlet 58. The flowable viscoelastic material 64 has a low effective head that allows it to flow up the overflow channel 50 without surge or agitation. The flowable viscoelastic material 64 wells over the dams 52, 54 and flows down the converging sidewalls 46, 48 of the forming body 44 as flow streams 64a, 64b. At the bottom of the forming body 44, the separate flow streams 64a, 64b rejoin to form a single sheet-like flow 66 with pristine surfaces 66a, 66b of fire-polished surface quality.

The initial thickness of the sheet-like flow 66 is determined by the amount of material flowing down the converging walls 46, 48, where the amount of material 64a, 64b flowing down the converging walls 46, 48 is dependent on the head pressure of the flowable viscoelastic material 64 and the geometry of the overflow channel 50.

Single-Sided Overflow Fusion Pipe

Figure 7A:
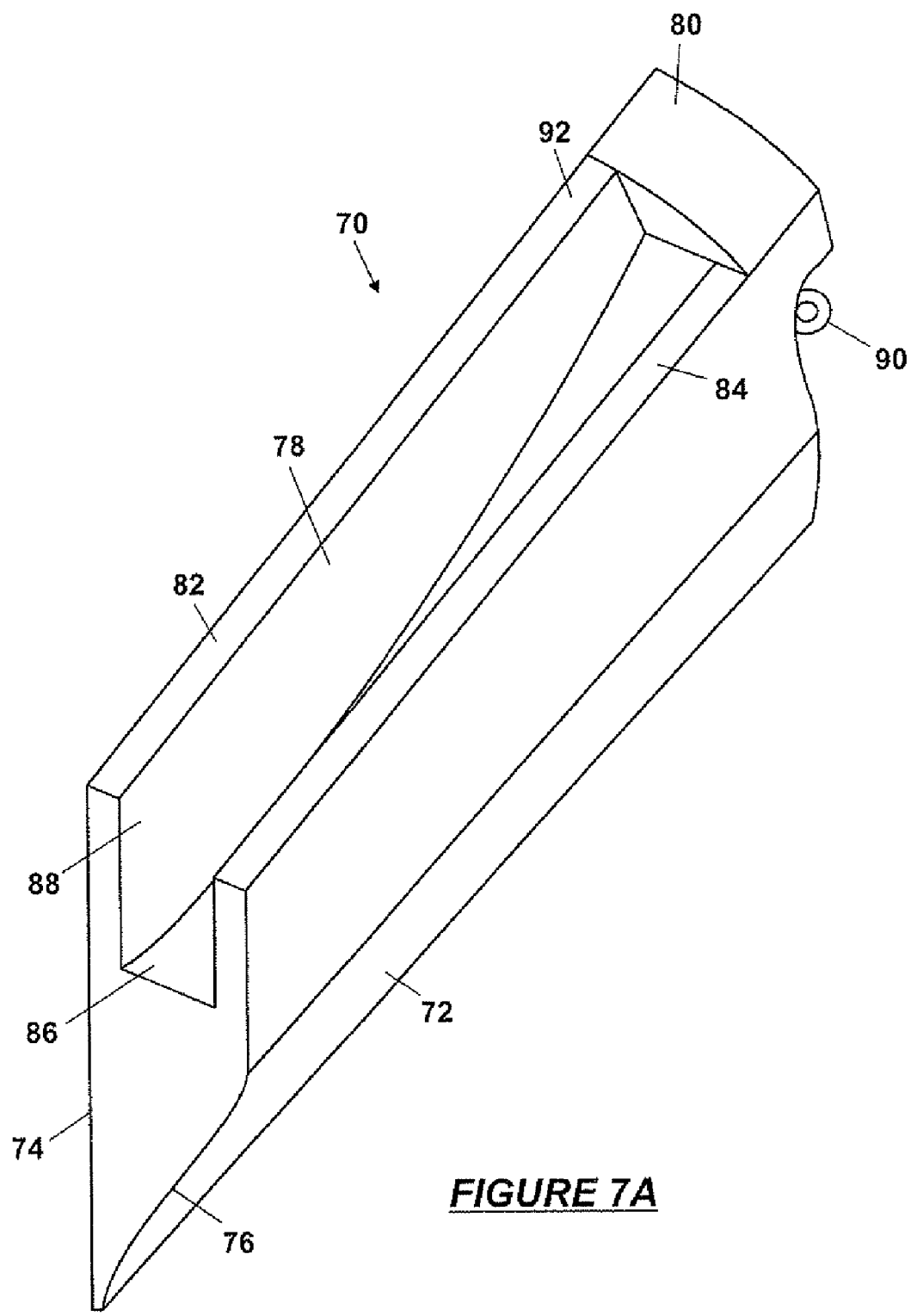
FIG. 7A shows a perspective view of a single-sided overflow fusion pipe.

FIG. 7A shows a single-sided overflow fusion pipe 70 having a wedge-shaped forming body 72 bounded by a straight sidewall 74 and a converging sidewall 76. An overflow channel 78 is formed in the upper portion of the forming body 72. The overflow channel 78 is bounded by sidewalls (or dams) 82, 84 and a contoured bottom surface 86. The dam 82 is higher than the dam 84, so that overflow occurs only at the dam 84. In operation, a delivery pipe (not shown) would be connected to the inlet 88 of the overflow channel 78 for delivery of a viscous, flowable material to the overflow channel 78. The shape of the contoured bottom surface 86 is such that the height of the overflow channel 78 decreases as it extends outwardly from the inlet 88 to the dam 80.

The fusion pipe 70 can be pivotally adjusted by any suitable means, such as roller, wedge, or cam 90, such that the upper surfaces of the dams 82, 84 have a desired tilt angle with respect to the horizontal. The tilt angle of the dams 82, 84, the rate at which a viscous, flowable material is supplied to the overflow channel 78, and the viscosity of the flowable material can be selected such that a single sheet-like flow having a uniform thickness is formed.

Figure 7B:
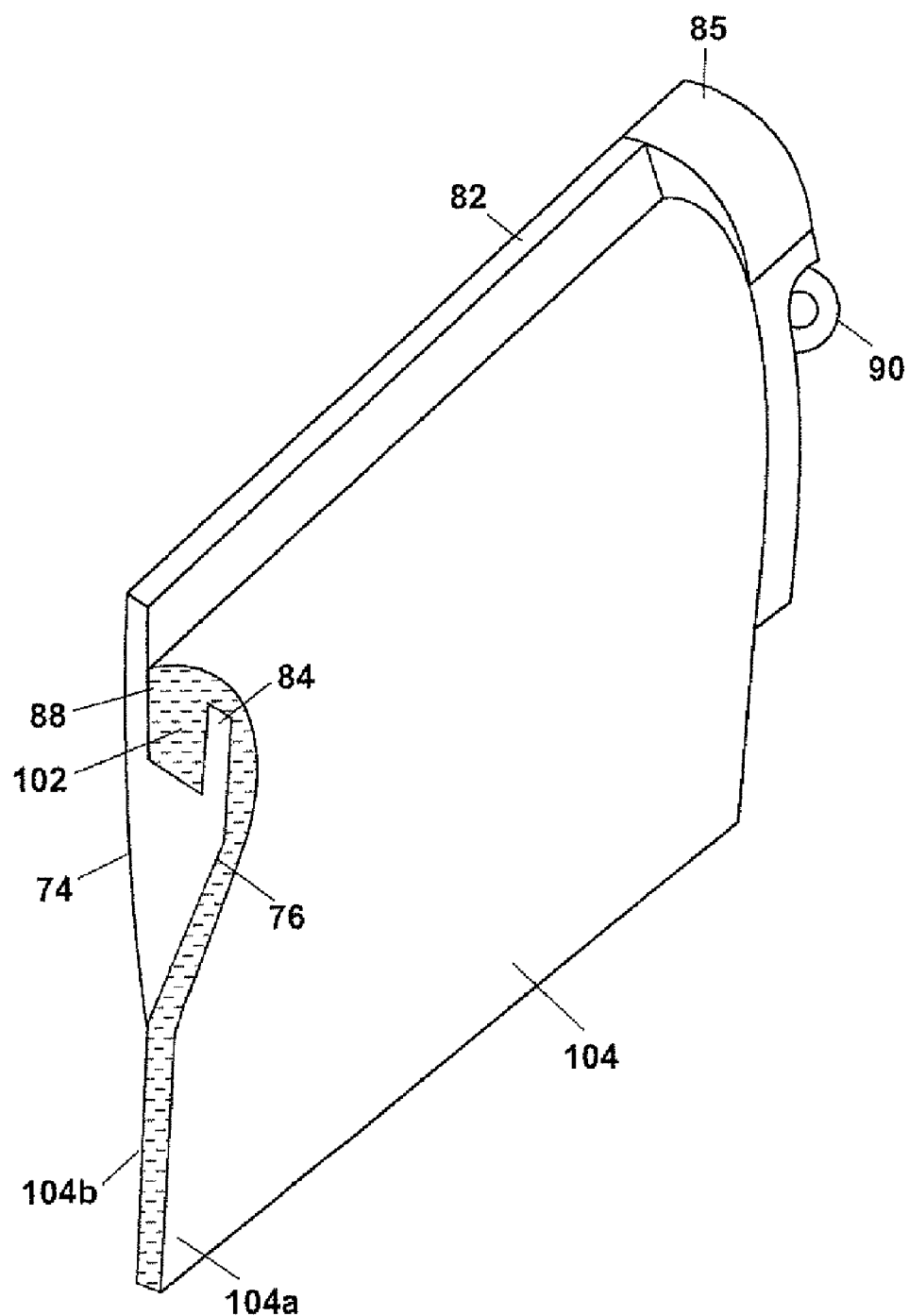
FIG. 7B shows a method for forming a sheet-like flow using the single-sided overflow fusion pipe of FIG. 7A.

In operation, a viscoelastic material, e.g., a glass or polymer material, is blended, melted, and stirred well. As shown in FIG. 7B, the homogeneous flowable viscoelastic material 102 is then delivered to the channel inlet 88. The flowable viscoelastic material 102 has a low effective head that allows it to flow into the overflow channel 78 without surge or agitation. The flowable viscoelastic material 102 wells over the dam 84 and flows down the converging sidewall 76 of the forming body 72 to form a single sheet-like flow 104 with pristine surface 104a of fire-polished surface quality. The surface 104b is not pristine because it makes contact with the converging sidewall 76.

The initial thickness of the sheet-like flow 104 is determined by the amount of material 102 flowing down the converging sidewall 76, where the amount of material 102 flowing down the converging sidewall 76 is dependent on the head pressure of the flowable viscoelastic material 102 and the geometry of the overflow channel 78.

Multi-Compartment Overflow Fusion Pipe

Figure 8A:
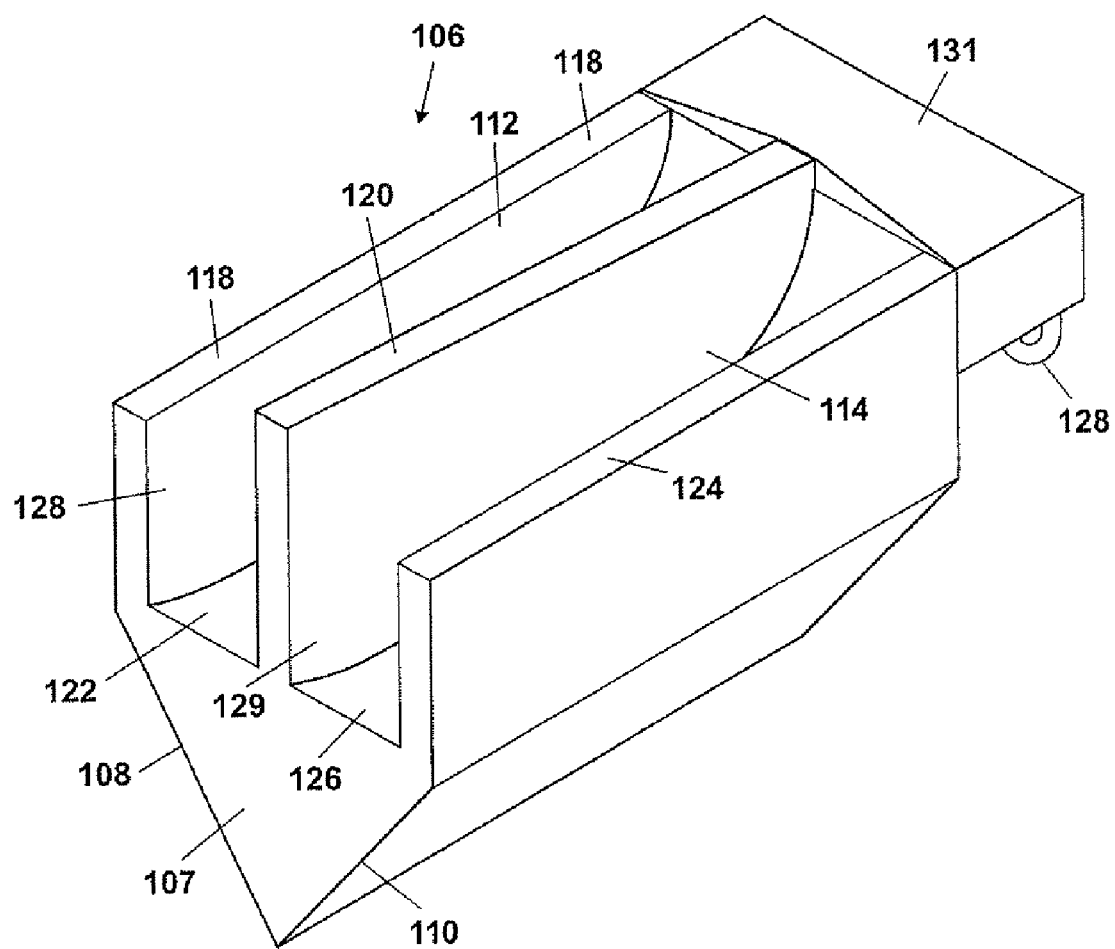
FIG. 8A shows a perspective view of a multi-compartment overflow fusion pipe.

FIG. 8A shows an overflow fusion pipe 106 having a wedge-shaped forming body 107 bounded by converging sidewalls 108, 110. Independent overflow channels 112, 114 are formed in the upper portion of the forming body 107. The overflow channel 112 is bounded by sidewalls (or dams) 118, 120 and a contoured bottom surface 122. The dam 120 is higher than the dam 118 so that overflow occurs only at the dam 118. The overflow channel 114 is bounded by sidewalls (or dams) 120, 124 and a contoured bottom surface 126. The dam 120 is higher than the dam 124 so that overflow occurs only at the dam 124. In operation, delivery pipes would be connected to the inlets 128, 129 of the overflow channels 112, 114, respectively. The shapes of the contoured bottom surfaces 122, 126 are such that the height of the overflow channels 112, 114 decrease as they extend outwardly from the inlets 128, 129 to the dam 131.

Figure 8B:
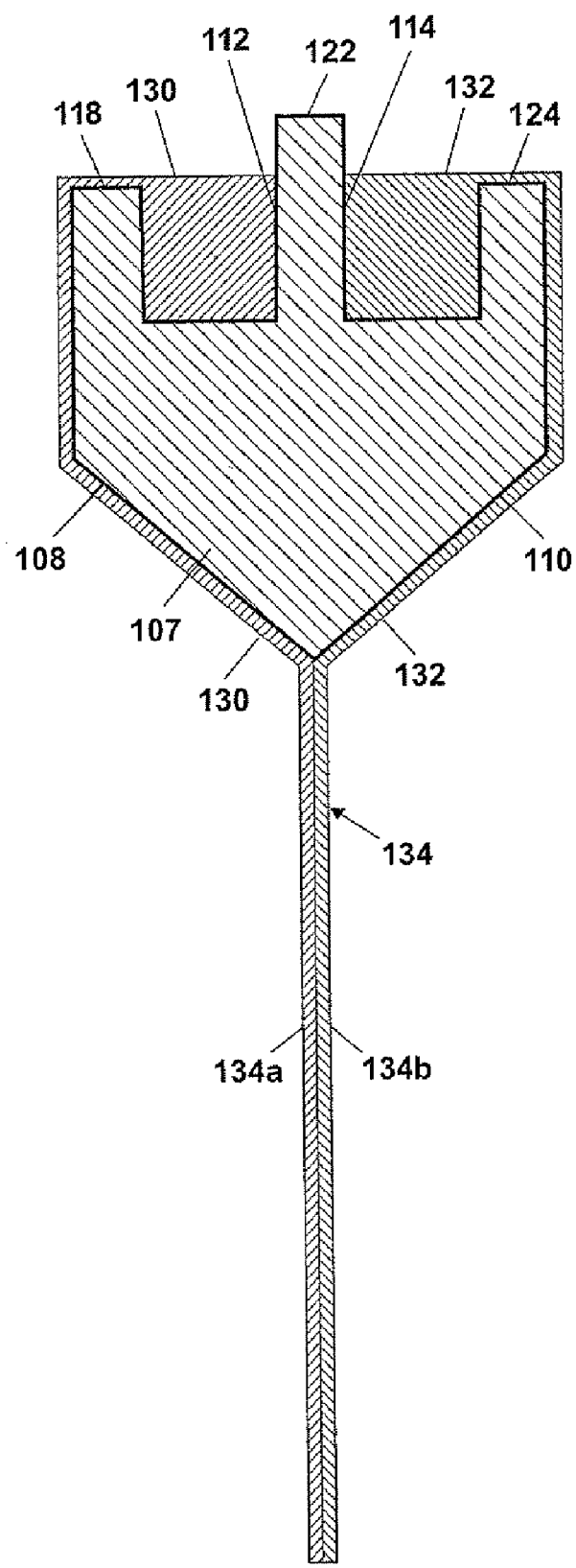
FIG. 8B shows a method for forming a laminated sheet-like flow using the multi-compartment overflow fusion pipe of FIG. 8A.

In operation, as shown in FIG. 8B, a first flowable viscoelastic material 130 is delivered to the channel inlet (128 in FIG. 8A) and a second flowable viscoelastic material 132 is delivered to the channel inlet (129 in FIG. 8B). The flowable viscoelastic materials 130, 132 have a low effective head that allows them to flow into the overflow channels 112, 114, respectively, without surge or agitation. The flowable viscoelastic materials 130, 132 well over the dams 118, 124, respectively, and flow down the converging sidewalls 108, 110 of the forming body 107. At the bottom of the forming body 107, the materials 130, 132 merge to form a laminated, sheet-like flow 134 with pristine surfaces 134a, 134b of fire-polished surface quality.

The initial thickness of the sheet-like flow 134 is determined by the amount of materials 130, 132 flowing down the converging sidewalls 108, 110, where the amount of materials 130, 132 flowing down the converging sidewalls 108, 110 are dependent on the head pressure of the viscous, flowable materials 130, 132 and the geometry of the overflow channels 112, 114.

Down Draw Process

Figure 9A:
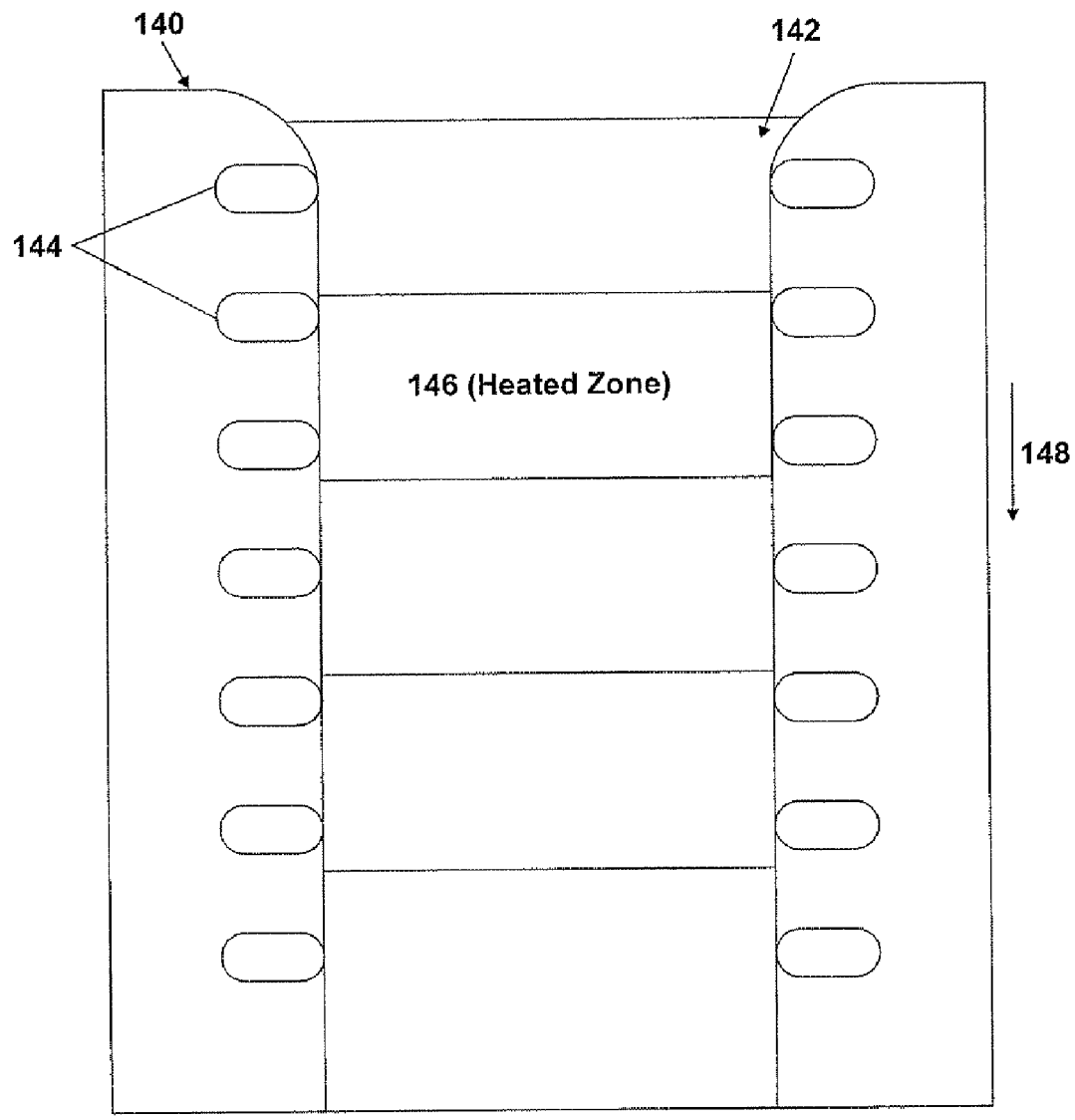
FIG. 9A shows a device for drawing a sheet-like flow into a sheet.

Various types of overflow fusion pipes have been described above for forming a sheet-like flow. The fusion process further includes drawing the sheet-like flow into a sheet with a desired thickness. FIG. 9A shows a drawing device 140 according to an embodiment of the invention. The drawing device 140 includes a channel 142 for receiving a sheet-like flow (not shown). The channel 142 is shown as vertical but could also have some other orientation, e.g., horizontal. A vertical channel is generally preferred because drawing is favored under vertical conditions due to the effect of gravity. The width of the channel 142 determines the width of the final sheet (not shown). Typically, the cross-draw dimension of the final sheet is greater than about 4 feet. However, a sheet having a small cross-draw dimension may also be formed.

Sets of rollers (or edge guides) 144 are positioned along the length of the channel 142 to convey the sheet-like flow (not shown) through the channel 142 and to control (attenuate) the thickness of the sheet-like flow. A series of heated zones 146 are defined inside the channel 142. The heated zones 146 become progressively cooler in the direction shown by the arrow 148. The zones 146 may be heated by electrical heating elements, induction heaters, or other heating means (not shown).

Figure 9B:
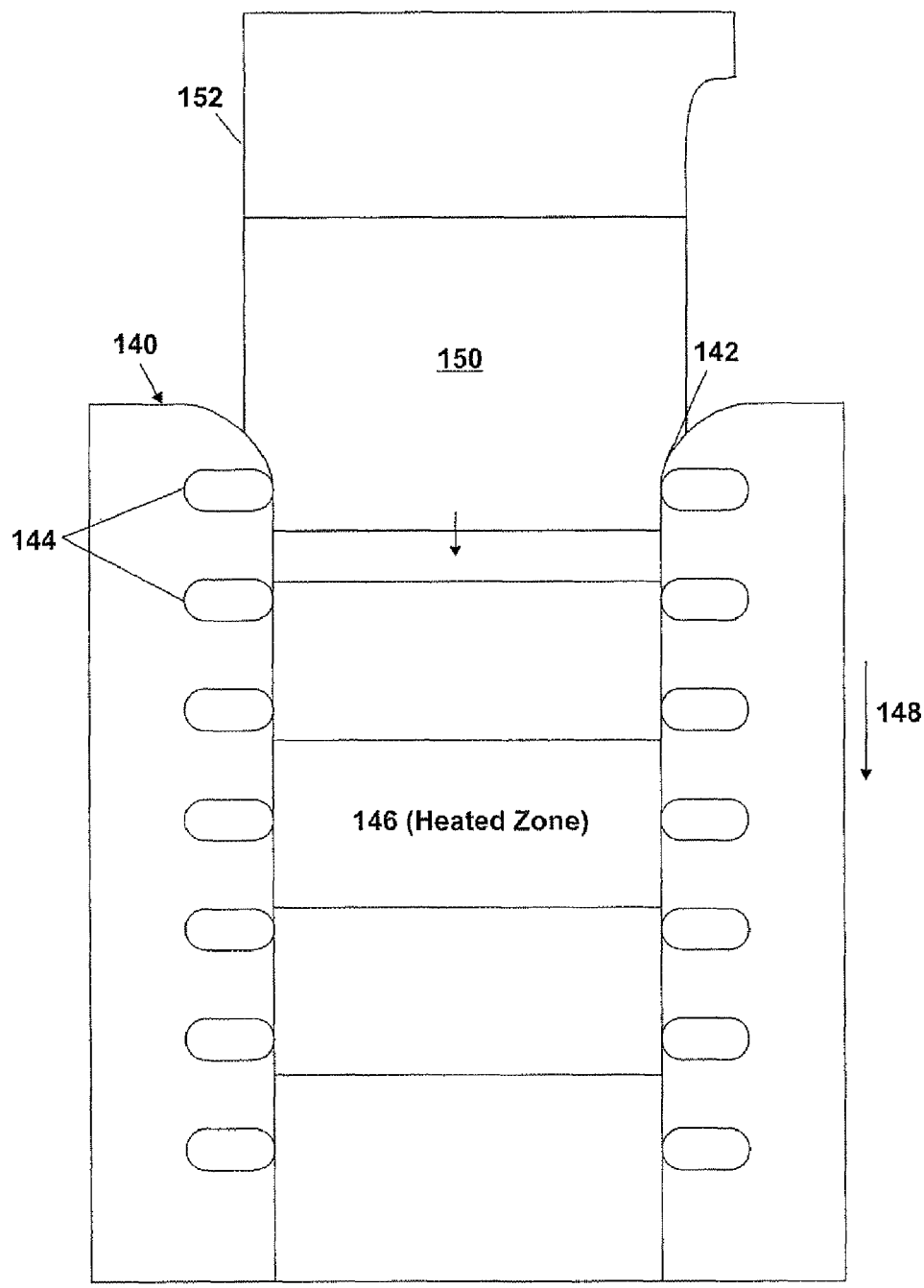
FIG. 9B shows a sheet-like flow advancing into the device of FIG. 9A.
Figure 9C:
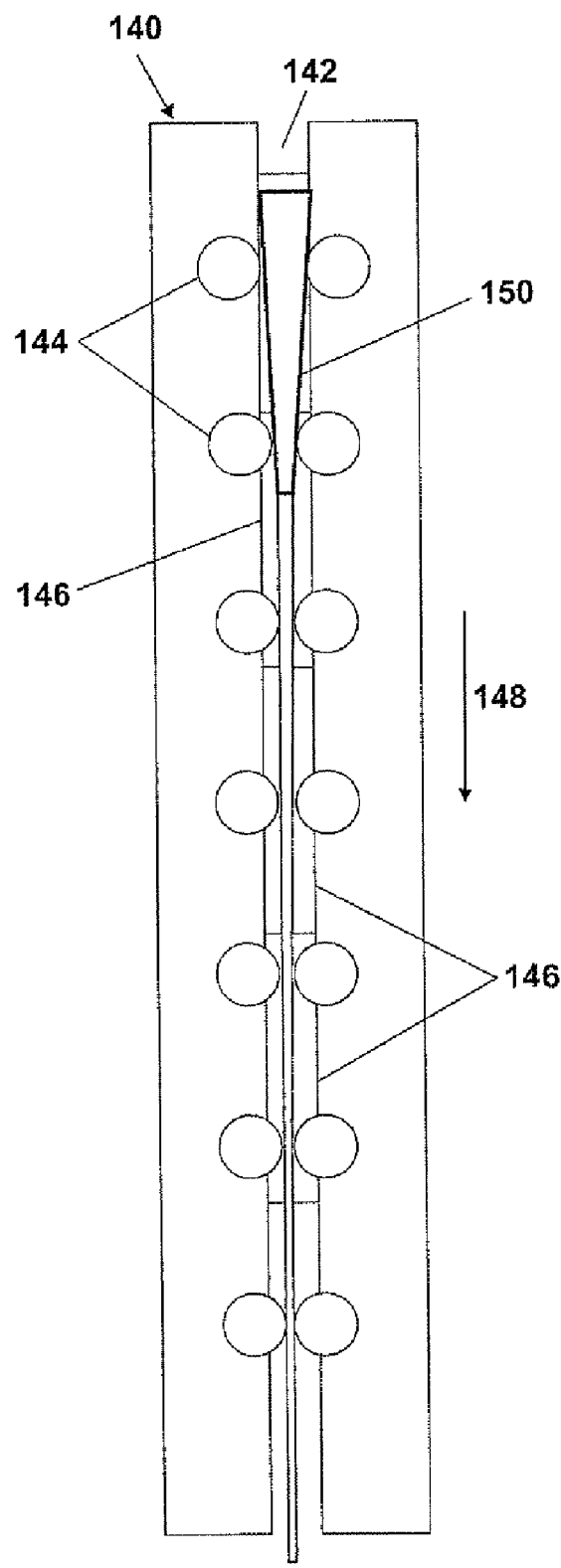
FIG. 9C shows a side view of the device shown in FIG. 9A with a sheet-like flow being conveyed through the channel of the device.

FIG. 9B shows a sheet-like flow 150 advancing from a fusion pipe 152 into the channel 142. The sheet-like flow 150 may be guided into the channel 142 by means of edge guides (not shown). Referring to FIG. 9C, inside the channel 142, paired rollers 144 gently grip (or press against) the vertical edges of the sheet-like flow 150 and convey the sheet-like flow 150 down the channel 142. The spacing between each of the paired rollers 144 is such that the thickness of the sheet-like flow 150 is gradually reduced as the sheet-like flow 150 is conveyed down the channel 142. If necessary, temperature can be used to "tweak" the thickness of the sheet-like flow 150, i.e., a hot or cold spot can be applied to selected regions of the flow to thin or thicken the flow 150.

Figure 9D:
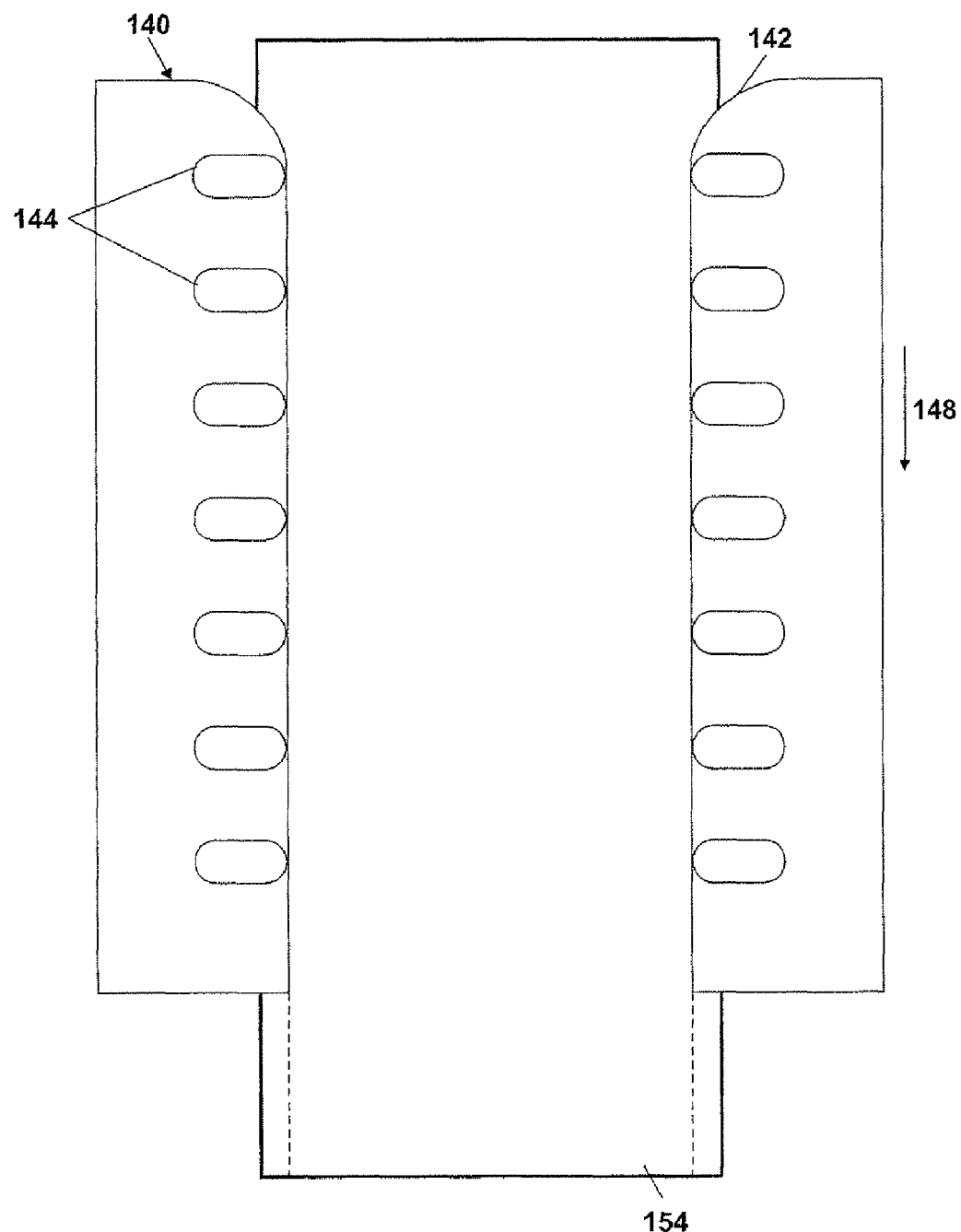
FIG. 9D shows a sheet emerging from the device of FIG. 9A.

As the sheet-like flow 150 is conveyed through the cooler regions of the heated zones 146, it is formed into a very flat and uniform sheet. FIG. 9D shows the sheet 154 coming out of the channel 142. The sheet 154 can be scored and cut as necessary, Typically, the vertical edges of the sheet 154, which have been in contact with the rollers 144, would have to be trimmed off because they are not pristine.

Figure 10:
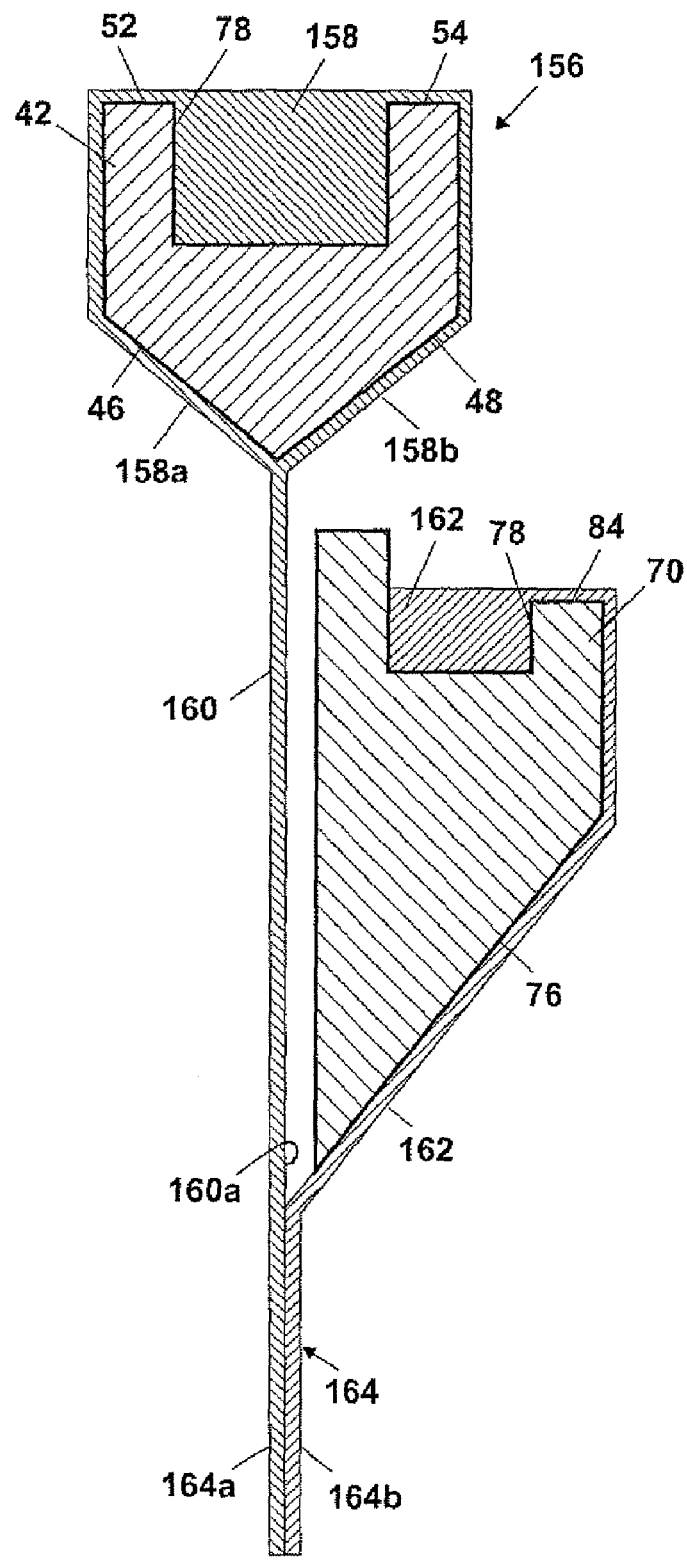
FIG. 10 illustrates a method of forming a two-layered laminated sheet using a double-sided overflow fusion pipe and a single-sided overflow fusion pipe.

Method of Forming a Two-Layered Laminated Sheet Using a Single-Sided and a Double-Sided Overflow Fusion Pipe FIG. 10 shows an apparatus 156 for making a two-layered laminated sheet. The apparatus 156 includes the double-sided overflow fusion pipe 42 previously shown in FIG. 6A) and the single-sided overflow fusion pipe 70 (previously shown in FIG. 7A). The double-sided overflow fusion pipe 42 is placed above the single-sided overflow fusion pipe 70. In general, the fusion pipes 42, 70 are arranged in a manner that allows the sheet-like flow produced by the fusion pipe 42 to be merged with the sheet-like flow produced by the fusion pipe 70.

In operation, the overflow channel 78 in the fusion pipe 42 is filled with a first flowable viscoelastic material 158, e.g., a glass or polymer material. The flowable viscoelastic material 158 wells over the dams 52, 54 and flows down the converging sidewalls 46, 48 as separate flow streams 15a, 158b. The flow streams 158a, 158b rejoin at the bottom of the fusion pipe 42 to form a single sheet-like flow 160.

Similarly, the overflow channel 78 in the fusion pipe 70 is filled with a second flowable viscoelastic material 162, e.g., a glass or polymer material. The viscous, flowable material 162 wells over the dam 84 and flows down the converging sidewall 76 to form a single sheet-like flow 162. The single sheet-like flow 162 merges with the surface 160a of the single sheet-like flow 160 to form a laminated flow 164. The surfaces 164a, 164b of the laminated flow 164 are pristine and of fire-polished surface quality. The laminated flow 164 is then drawn into a sheet using the drawing device (140 in FIG. 9A).

It should be noted that either of the surfaces 164a, 164b can serve as a basis for forming functional elements because they are both pristine. In general, the final thickness and optical characteristics of each layer of the laminated sheet will determine whether the layer can act as a surface layer or a core layer.

Figure 11:
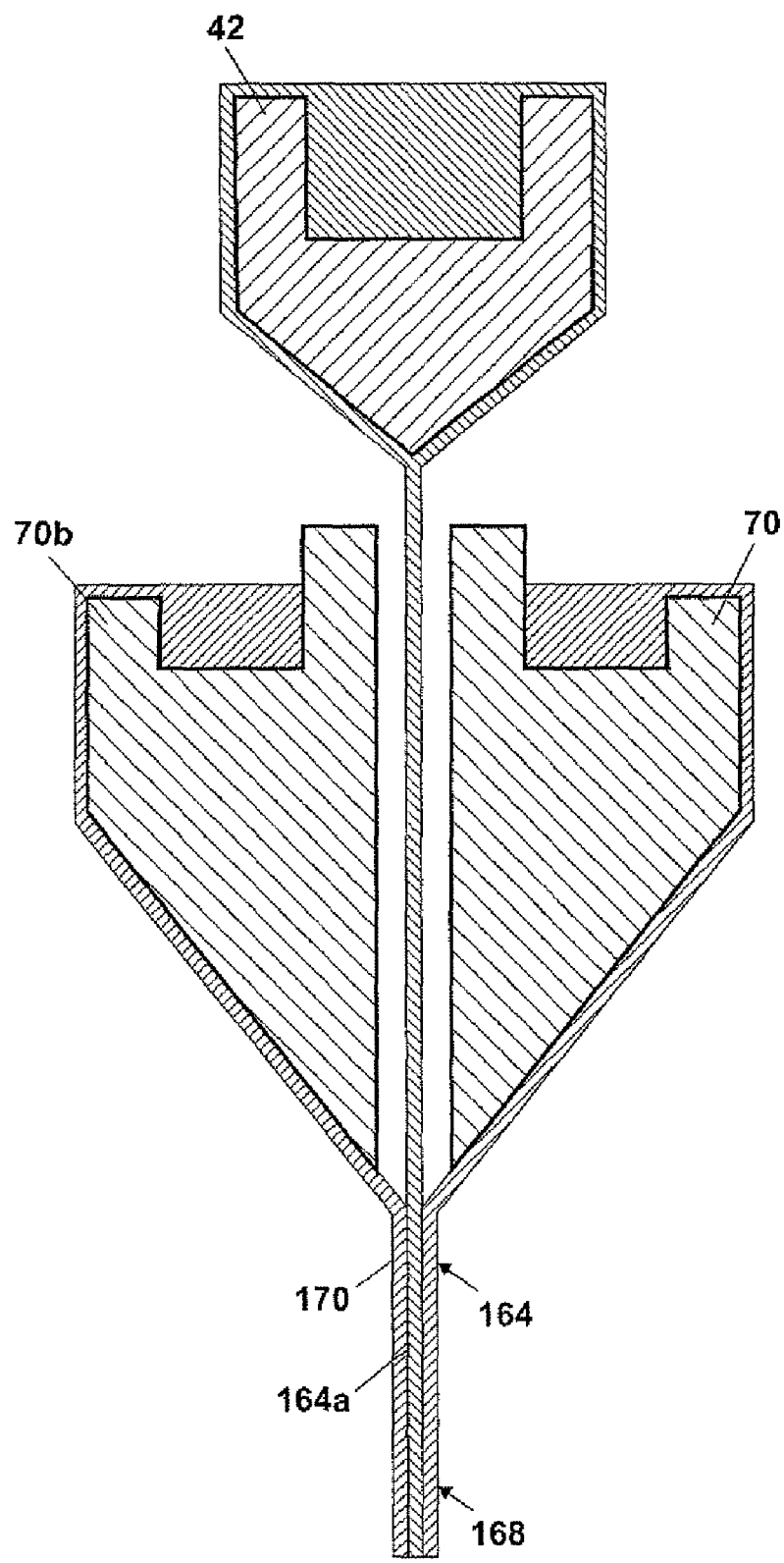
FIG. 11 illustrates a method of forming a three-layered laminated sheet using a double-sided overflow fusion pipe and two single-sided overflow fusion pipes.

Method of Forming a Three-Layered Laminated Sheet Using two Single-Sided and a Double-Sided Overflow Fusion Pipes The apparatus 156 shown in FIG. 10 can be easily modified to form a three-layered sheet. As shown in FIG. 11, another single-sided overflow fusion pipe 70b can be used to form a single sheet-like flow 170, which can then be merged with the surface 164a of the sheet-like flow 164 to form a three-layered laminated flow 168. The laminated flow 168 can be drawn into a sheet using the drawing device (140 in FIG. 9A). One or more layers can be added to the laminated flow 168 using additional single-sided overflow fusion pipes, positioned below the overflow fusion pipes 70, 70b.

Figure 12:
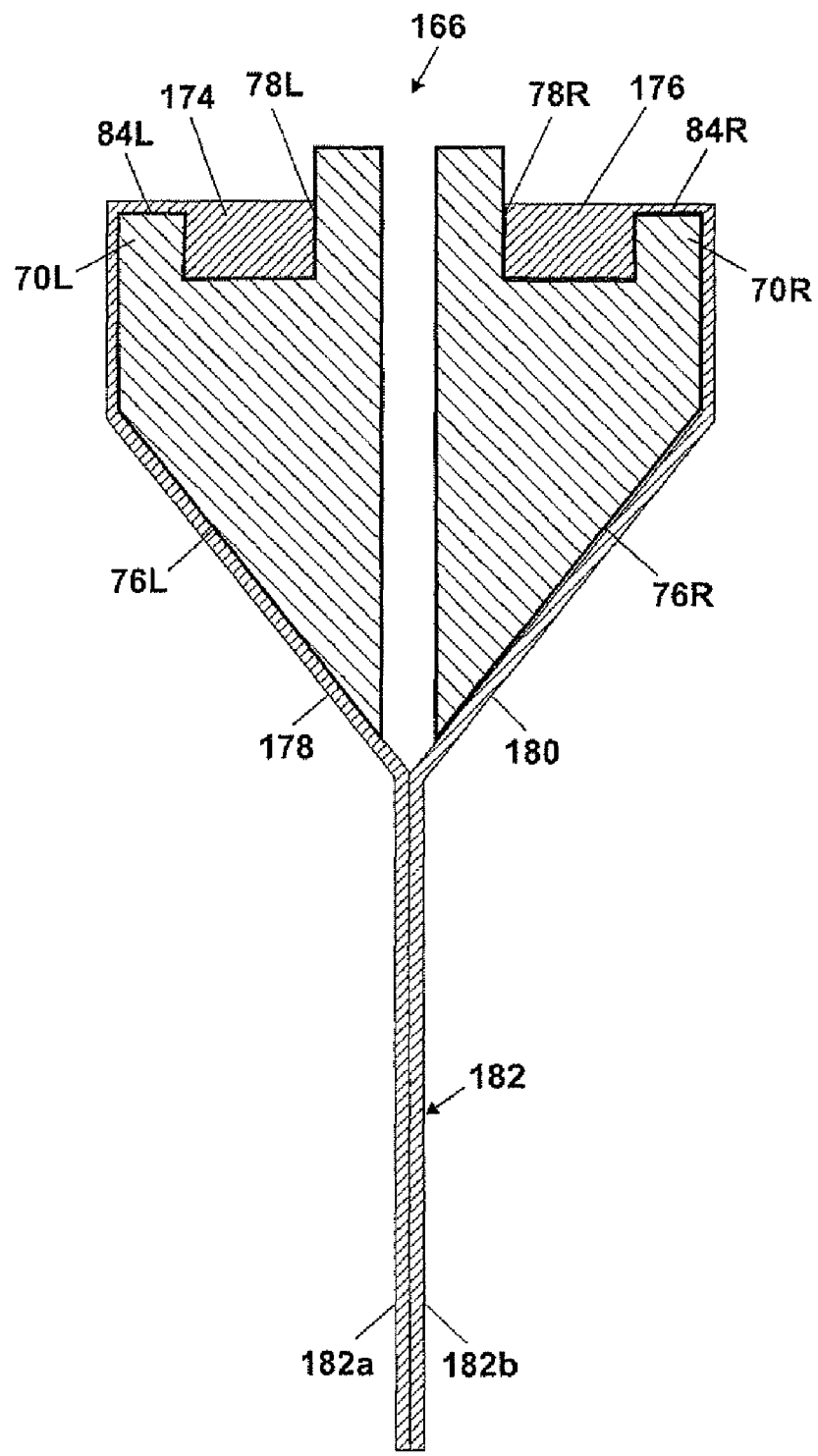
FIG. 12 illustrates a method of forming a two-layered laminated sheet using two single-sided overflow fusion pipes.

Method of Forming a Two-Layered Laminated Sheet Using two Single-Sided Overflow Fusion Pipes FIG. 12 shows an apparatus 166 for making a two-layered laminated sheet. The apparatus 166 includes two of the single-sided overflow fusion pipes 70 (previously shown in FIG. 5), herein identified as fusion pipes 70R and 70L. The fusion pipes 70R and 70L are positioned at the same height. However, if desired, one fusion pipe can be elevated above the other. In general, the fusion pipes 70R and 70L are positioned such that the sheet-like flows they produce merge to form a single laminated flow.

In operation, a first viscoelastic material 174, e.g., a glass or polymer material, is supplied to the overflow channel 78L. At the same time, a second viscoelastic material 176, e.g., a glass or polymer material, is supplied to the overflow channel 78R. The viscoelastic materials 174, 176 well over the dams 84L, 84R, respectively, and flow down the converging sidewalls 76L, 76R, respectively, to form the single sheet-like flows 178, 180, respectively. The single-sheet like flows 178, 180 merge to form a laminated flow 182 with pristine surfaces 182a, 182b of fire-polished surface quality. The laminated flow 182 is then drawn into a sheet using the drawing device (140 in FIG. 9A). Layers can be added to the laminated flow 182 by positioning one or more single-sided overflow fusion pipes below the fusion pipes 70L, 70R.

Again, either of the surfaces 182a, 182b can serve as a basis for forming functional elements because they are both pristine. In general, the final thickness and optical characteristics of each layer of the laminated sheet will determine whether the layer can act as a surface layer or a core layer

Figure 13:
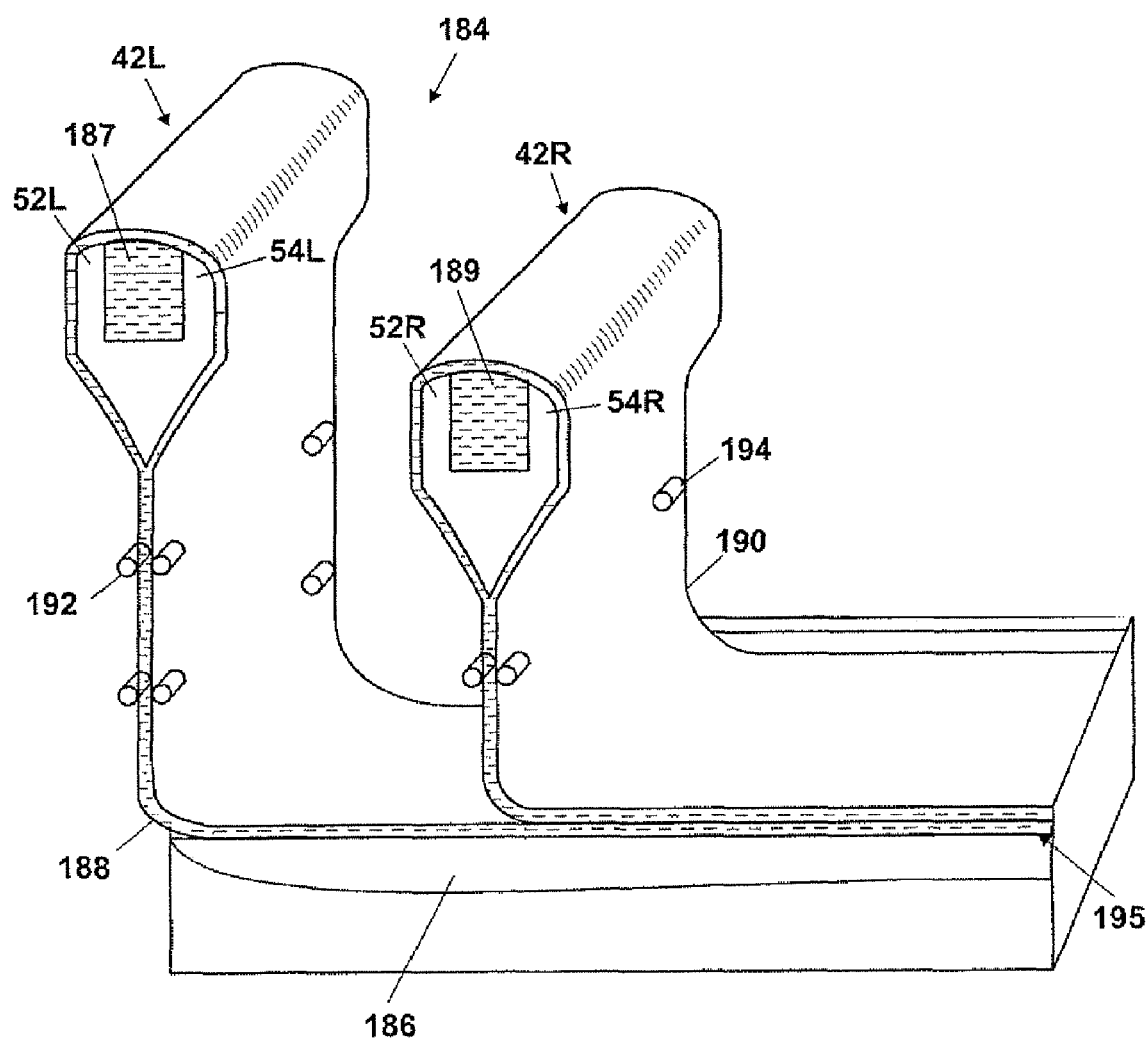
FIG. 13 illustrates a method of forming a two-layered laminated sheet using two double-sided overflow fusion pipes.

Method of Forming a Two-Layered Laminated Sheet Using two Double-Sided Overflow Fusion Pipes FIG. 13 shows an apparatus 184 for making a two-layered laminated sheet. The apparatus 184 includes two of the double-sided overflow fusion pipes 42 previously shown in FIG. 6A), herein identified as fusion pipes 42R and 42L. The fusion pipes 42R 42L are spaced apart horizontally. The fusion pipe 42L is elevated above the fusion pipe 42R. Below the fusion pipes 42R, 42L is a float bath 186. The fusion pipes 42R, 42L are positioned such that the sheet-like flows they produce can be transitioned from the vertical to the horizontal and floated on the float bath 186. Edge guiding devices 192, 194, such as rollers, could be provided to guide the sheet-like flows from the vertical orientation to the horizontal orientation. The float bath 186 could be a bed of air, molten tin, molten polymer, or other floating material that is compatible with the materials that will be used in forming the laminated sheet.

In operation, the fusion pipes 42L, 42R are filled with viscous, flowable materials 187, 189, respectively. The viscous, flowable materials 187, 189 overflow the dams 52L, 54L and 52R, 54R, respectively, to form the sheet-like flows 188, 190. The sheet-like flow 188 is guided to the float bath 186 by edge guides 192 and floated on the float bath 186. The sheet-like flow 190 is guided to the sheet-like flow 188 by edge guide(s) 194 and merged with the sheet-like flow 188 to form a laminated flow 195. The laminated flow 195 can be transitioned from the float bath 186 into the drawing device (140 in FIG. 9A) for drawing into a laminated sheet. Additional double-sided overflow fusion pipes and/or single-sided overflow fusion pipes can be added to the apparatus 184 to make a laminated sheet with more than two layers.

Figure 14:
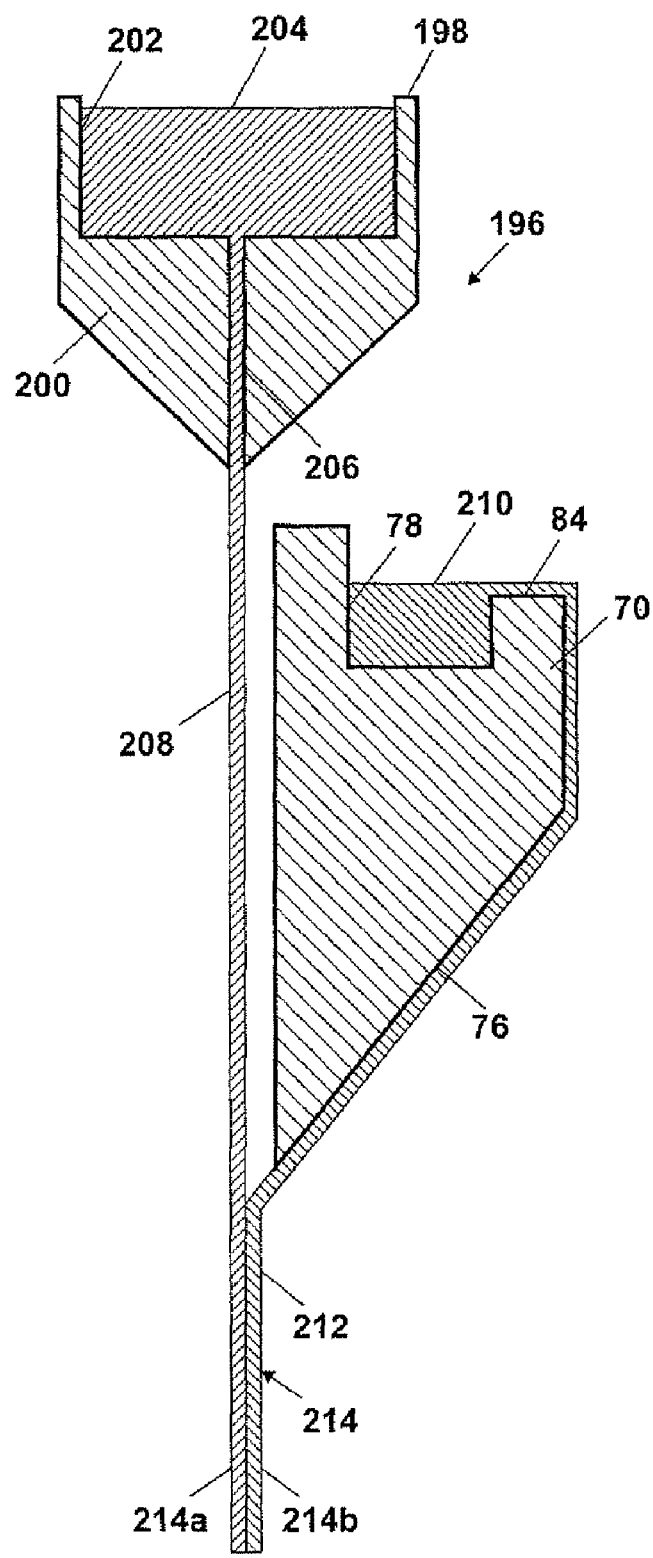
FIG. 14 illustrates a method of forming a two-layered laminated sheet using a single-sided overflow fusion pipe and a slot draw fusion pipe.

Method of Forming a Two-Layered Laminated Sheet Using a Single-Overflow Fusion Pipe and a Slot Draw Fusion Pipe FIG. 14 shows an apparatus 196 for making a two-layered laminated sheet. The apparatus 196 includes a single-sided overflow fusion pipe 70 and a slot draw device 198. The slot draw device 198 includes a forming body 200 having a channel 202 for receiving a viscous, flowable material 204. The forming body 200 also includes a longitudinal slot 206 which is connected to the channel 202. The viscous, flowable material 204 in the channel 202 flows down the slot 206 to form a sheet-like flow 208. The overflow channel 78 in the fusion pipe 70 is also filled with a viscous, flowable material 210, which wells over the dam 84 and flows down the converging sidewall 76 to form a sheet-like flow 212. The sheet-like flows 208, 212 merge to form a laminated flow 214 with a pristine surface 214b. The other surface 214a is not pristine because it contacts the slot draw device 198 as the sheet-like flow 208 flows down the slot 206. The laminated flow 214 can be drawn into a laminated sheet as previously described.

Figure 15:
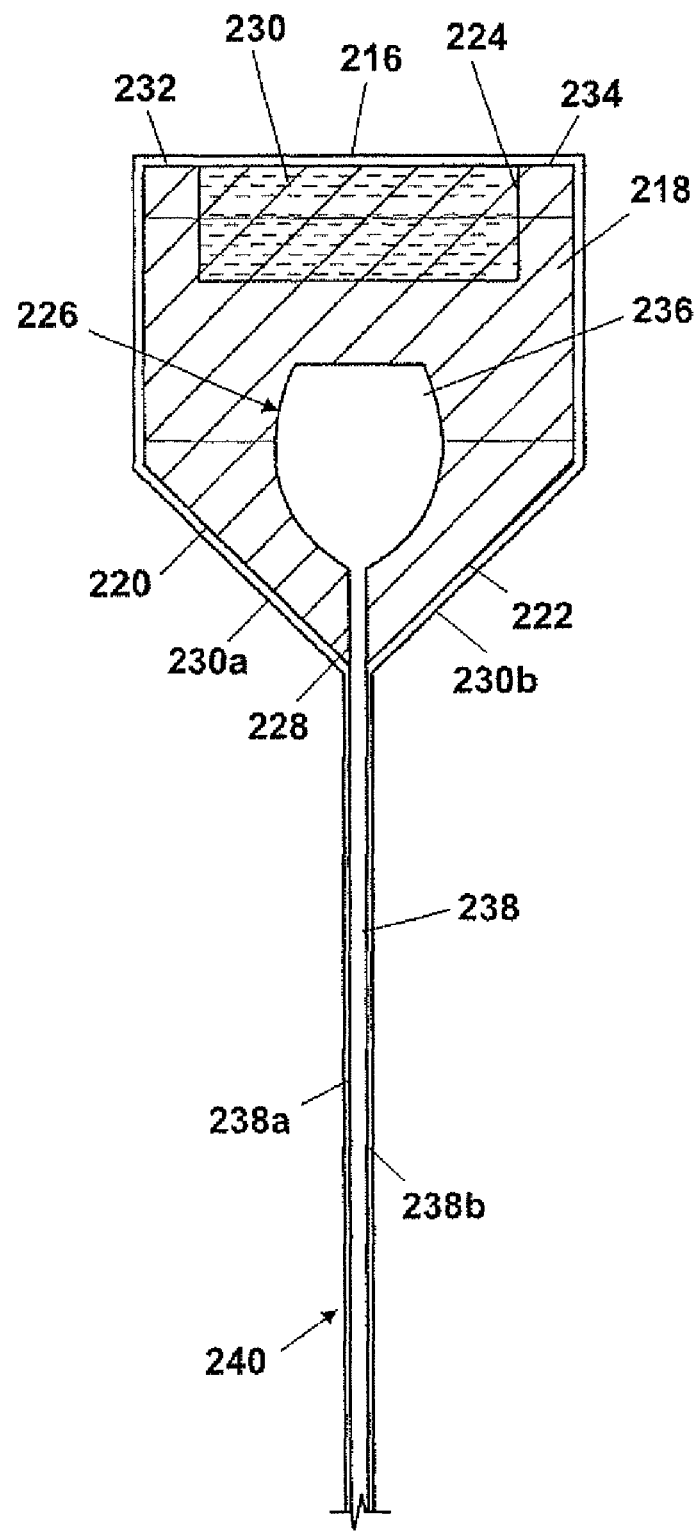
FIG. 15 illustrates a method of forming a two-layered laminated sheet using a double-sided overflow fusion pipe with an integrated slot draw fusion device.

Method for Forming a Two-Layered Laminated Sheet Using a Double-Sided Overflow Fusion Pipe with a Slot Draw Device FIG. 15 shows another type of double-sided overflow fusion pipe 216 that allows a laminated sheet to be formed via a combination of a fusion process and a slot draw process. The fusion pipe 216 has a forming body 218 bounded by converging sidewalls 220, 222. An overflow channel 224 is formed in the upper portion of the forming body 218. A channel 226 is formed in the base of the forming body 218. The channel 226 opens to the bottom of the forming body 218 through a longitudinal slot 228. Viscous, flowable material 230 in the overflow channel 224 wells over the dams 232, 234 and flows down the converging walls 220, 222 of the forming body 218 as flow streams 230a, 230b, respectively. Viscous, flowable material 236 in the channel 226 flows down the longitudinal slot 228 as a sheet-like flow 238. The separate streams 230a, 230b merge with the surfaces 238a, 238b of the sheet-like flow 238 to form a laminated flow 240.

Figure 16A:
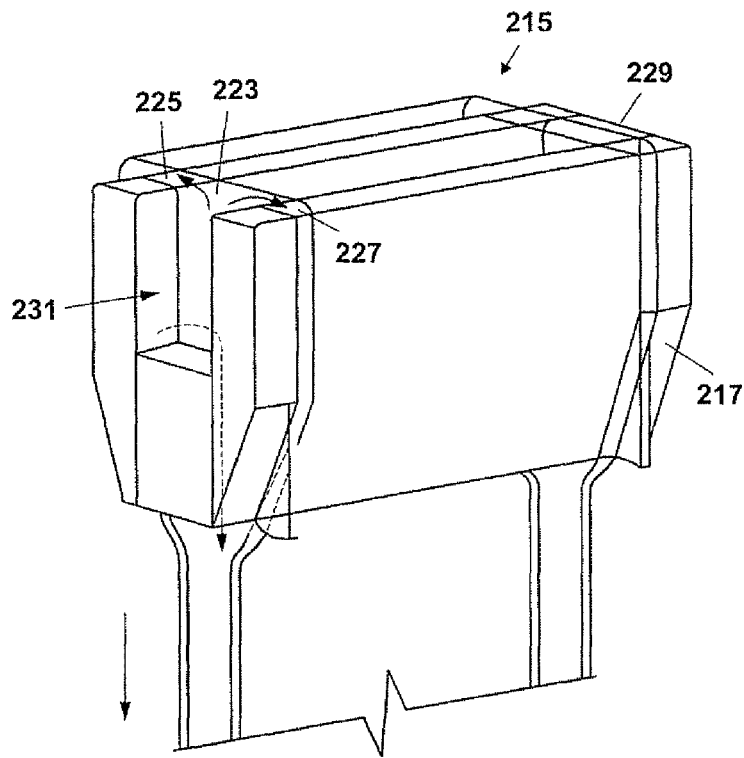
FIG. 16A shows a perspective view of a double-sided overflow fusion pipe with a combined overflow and slot draw channel according to another embodiment of the invention.
Figure 16B:
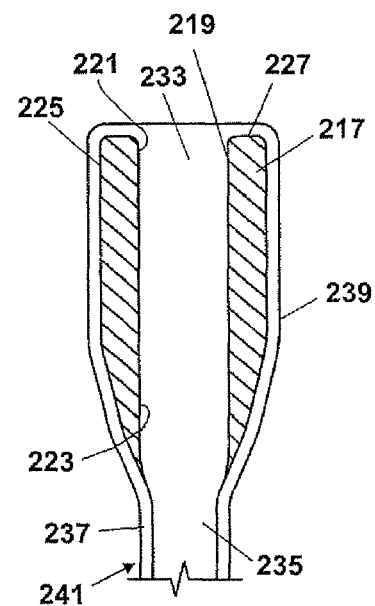
FIG. 16B is a vertical cross-section of the fusion pipe shown in FIG. 16A.

FIG. 16B shows another type of double-sided overflow fusion pipe 215 that allows a laminated sheet to be formed via a combination of a fusion process and a slot draw process. The fusion pipe 215 has a forming body 217. A channel 219 is formed in the forming body 217. As shown in FIG. 16B, the channel 219 runs through the forming body 217 and has an opening 221 at the top of the forming body 217 and an opening 223 at the bottom of the forming body 217. Returning to FIG. 16A, the channel 219 is bounded by sidewalls (or dams) 225, 227, 229. An inlet 231 is provided for feeding a viscous, flowable material 233 into the channel 219.

In operation, the viscous, flowable material 233 is simultaneously flowed over the dams 225, 227 and drained (or drawn) through the opening 223. The viscous, flowable material drained through the opening 223 forms a sheet-like flow 235. The viscous, flowable material flowed over the dams 225, 227 forms two separate flow streams 237, 239, which are merged with the surfaces of the sheet-like flow 235 to form a three-layered laminated flow 241. The laminated flow 241 can be drawn into a sheet using the drawing device (140 in FIG. 9A). Note that in this case, all the layers of the laminated flow 241 are made of the same material, but the center core layer (formed by the sheet-like flow 235) can be much thicker than the outer layers (formed by the flow streams 237, 239) to provide the laminated sheet with enhanced mechanical stiffness.

Figure 17:
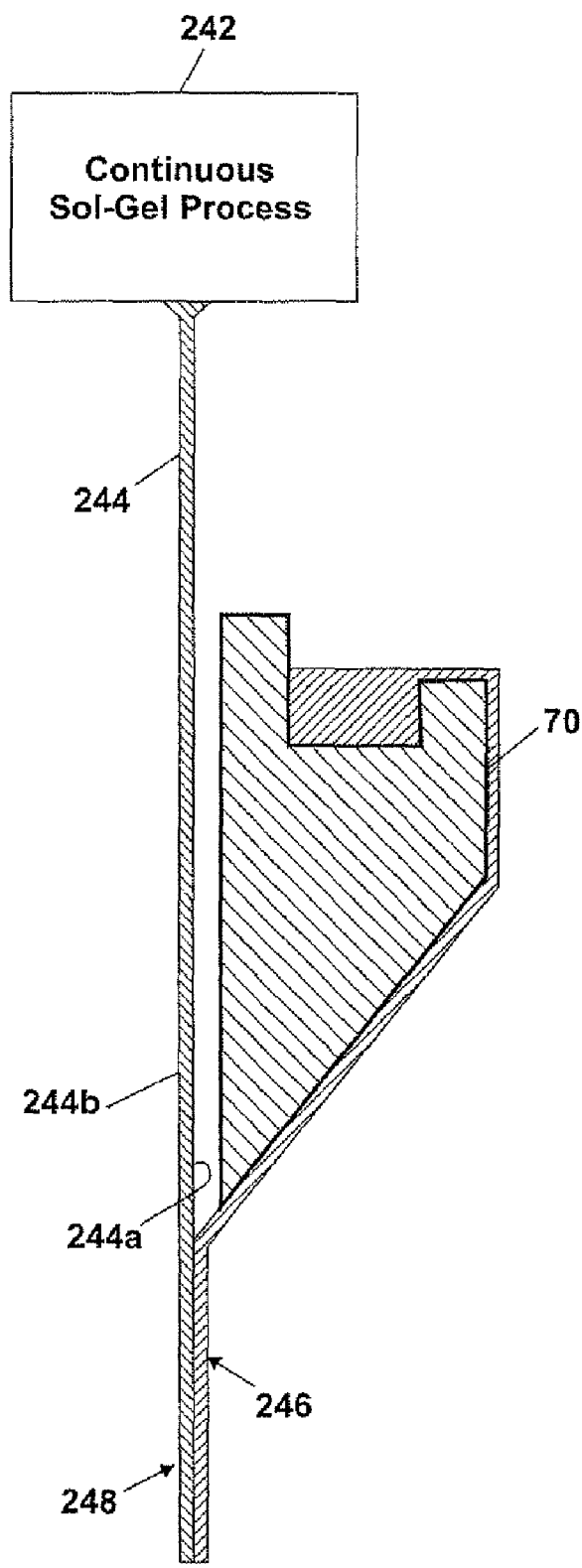
FIG. 17 illustrates a method of forming a two-layered laminated sheet using a continuous sol-gel process and a single-sided overflow fusion pipe.

Method of Forming a Two-Layered Laminated Sheet Using a Continuous Sol-Gel Process and a Single-Sided Overflow Fusion Pipe In FIG. 17, a continuous sol-gel process, indicated as 242, is used to produce an aerogel 244, which forms the core of a laminated sheet. The aerogel 244 has a continuous porosity and can be prepared as a transparent, porous solid. A single-sided overflow fusion pipe 70 is then used to form a sheet-like flow 246 which is merged with a surface 244a of the aerogel 244 to form a two-layered laminated flow 248, which can be drawn into a sheet using the drawing device (140 in FIG. 9A). To form a sandwich (or three-layered) laminated sheet, another single-sided overflow fusion pipe (not shown) can be used to form a sheet-like flow (not shown), which can be merged with the surface 244b of the aerogel 244.

The sol-gel process is well-known. The process generally involves preparing a "sol" using inorganic metal salts or metal organic compounds such as metal alkoxides. The starting materials are typically subjected to a series of hydrolysis and condensation reactions to form a colloidal suspension, i.e., the "sol." The sol undergoes a transition to a soft porous mass, called a "wet gel." The liquid in the wet gel can be removed by either air drying or supercritical extraction to form the aerogel. The aerogel is typically rigid. The aerogel can be made flexible by adding fibers to the sol, allowing the fiber-reinforced sol to gel, and extracting liquid from the gel.

Method of Making a Sandwich Laminated Sheet

The methods described above can be used to form the sandwich laminated structure illustrated in FIG. 5. In another embodiment, the core of the sandwich laminated structure is prepared separately. Then, fusion processes are used to add layers to the core. One motivation for forming the core separately is to allow for additional steps to enhance the properties, such as mechanical and thermal properties, of the core. For example, the core of the sandwich structure may be a glass material that is subjected to annealing steps prior to forming of the sandwich structure.

Figure 18:
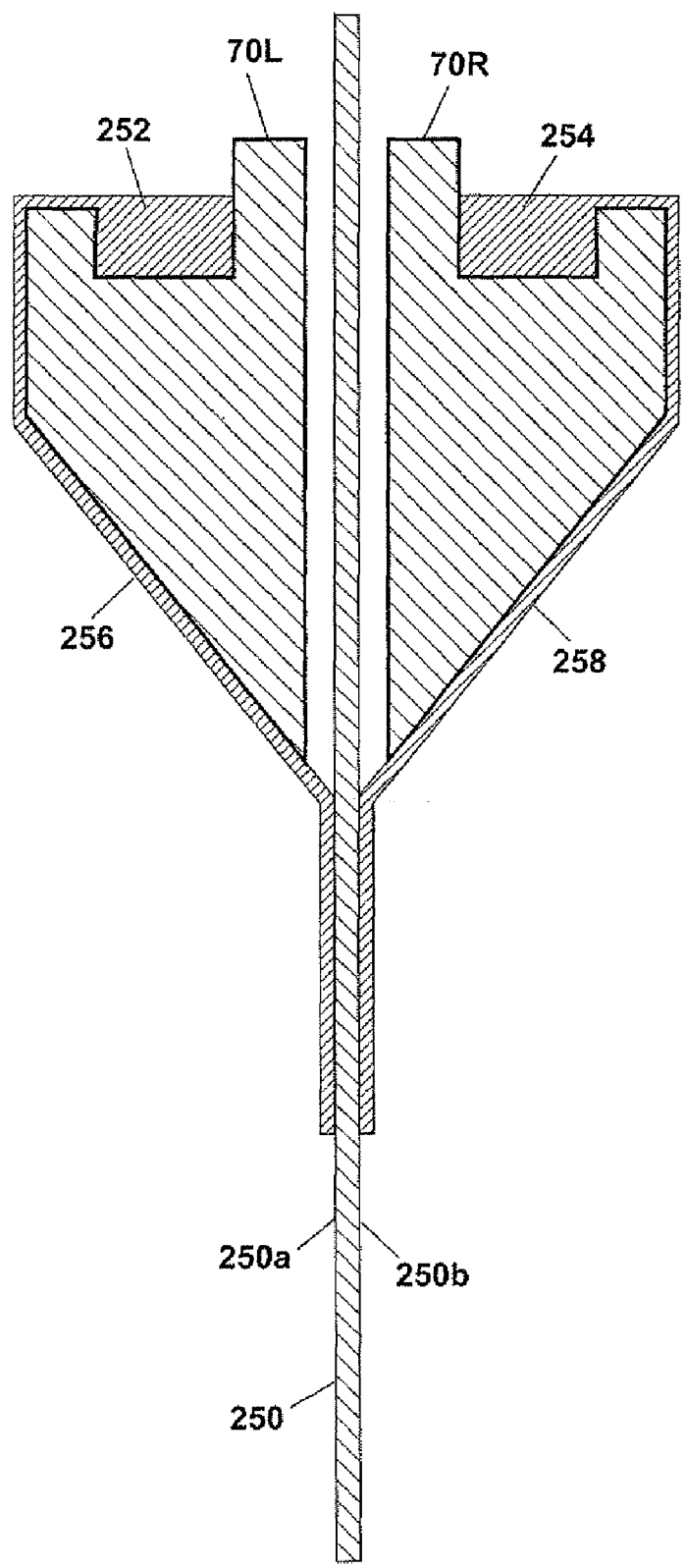
FIG. 18 illustrates a method of forming a sandwich laminated sheet structure.

FIG. 18 shows a core substrate 250 interposed between two single-sided overflow fusion pipes 70R, 70L. Viscous, flowable materials 252, 254 are supplied to the fusion pipes 70R, 70L and allowed to overflow in a controlled manner to form sheet-like flows 256, 258, respectively. The sheet-like flows 256, 258 merge with the surfaces 250a, 250b of the core substrate 250 to form the sandwich structure, which is drawn to the desired thickness.

Method for Applying Coating to a Fusion-Formed Surface

Figure 19:
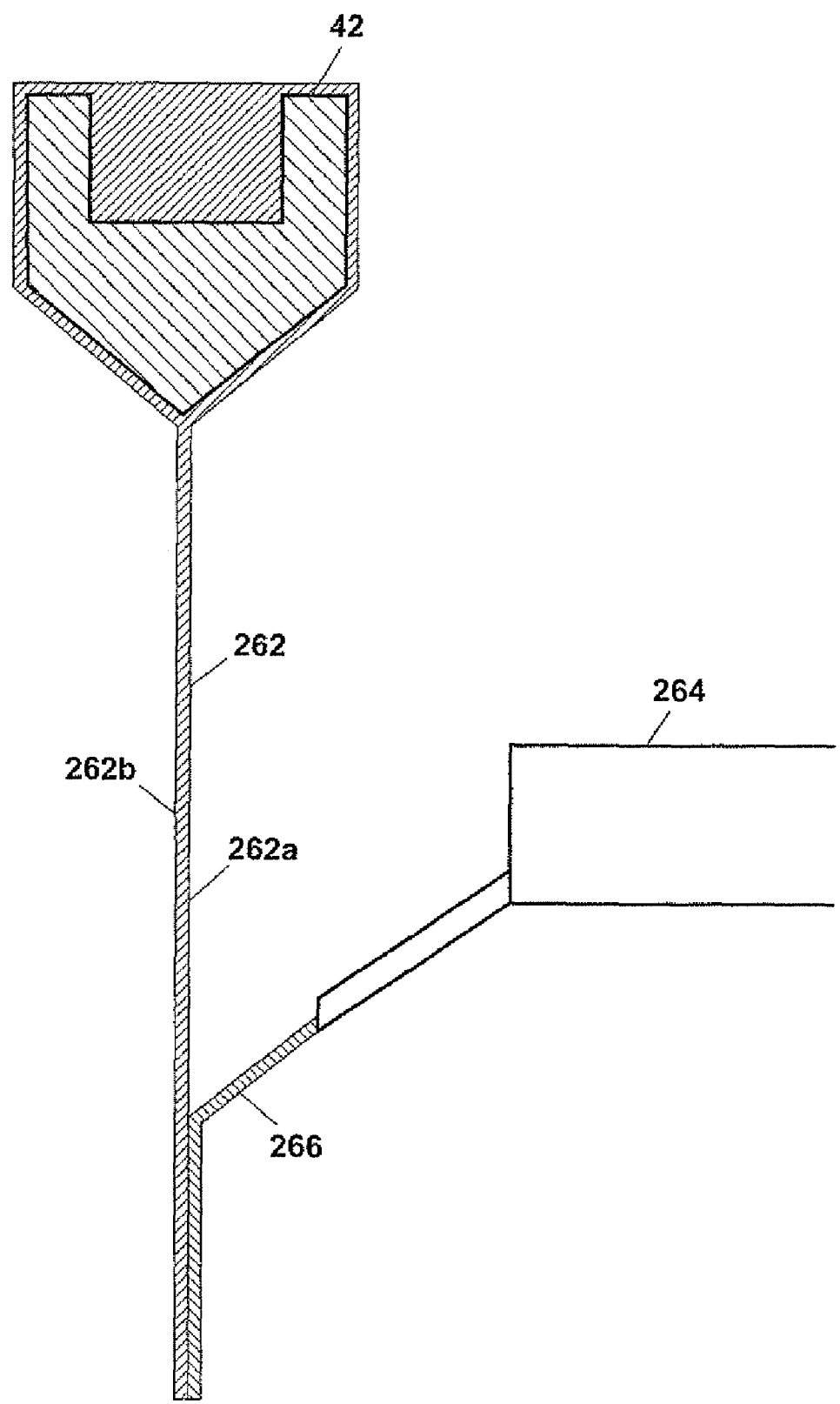
FIG. 19 illustrates a method of applying a coating material on a fusion-formed surface.

In FIG. 19, the double-sided overflow fusion pipe 42 previously shown in FIG. 6A) is used to form a sheet-like flow 262 with pristine surfaces 262a, 262b. While the sheet-like flow 262 is still in viscous, flowable form, a slot/trough type delivery system 264 is used to deliver a coating material 266 to the surface 262a of the sheet-like flow 262.

Figure 20:
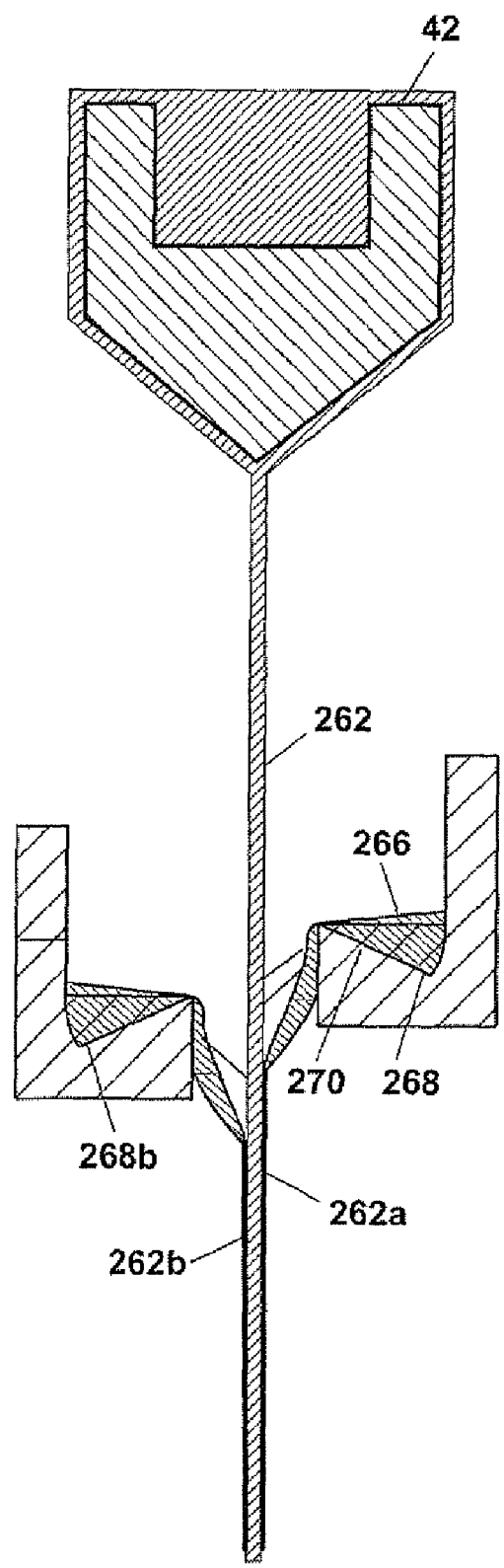
FIG. 20 shows a coating material delivered to a fusion-formed surface via an overflow channel.

Other delivery systems besides the slot/trough type delivery system 264 can also be used to deliver the coating material 266. For example, FIG. 20 shows the coating material 266 being delivered via an overflow channel 268. The coating material 266 is delivered into the channel 268 and allowed to overflow in a controlled manner over the dam 270. The dam 270 is positioned relative to the surface 262a such that the coating material 266 merges with the surface 262a as it overflows from the dam 270. Another overflow channel 268b (or other delivery system) can be provided to coat the other surface 262b of the sheet-like flow 262.

Figure 21:
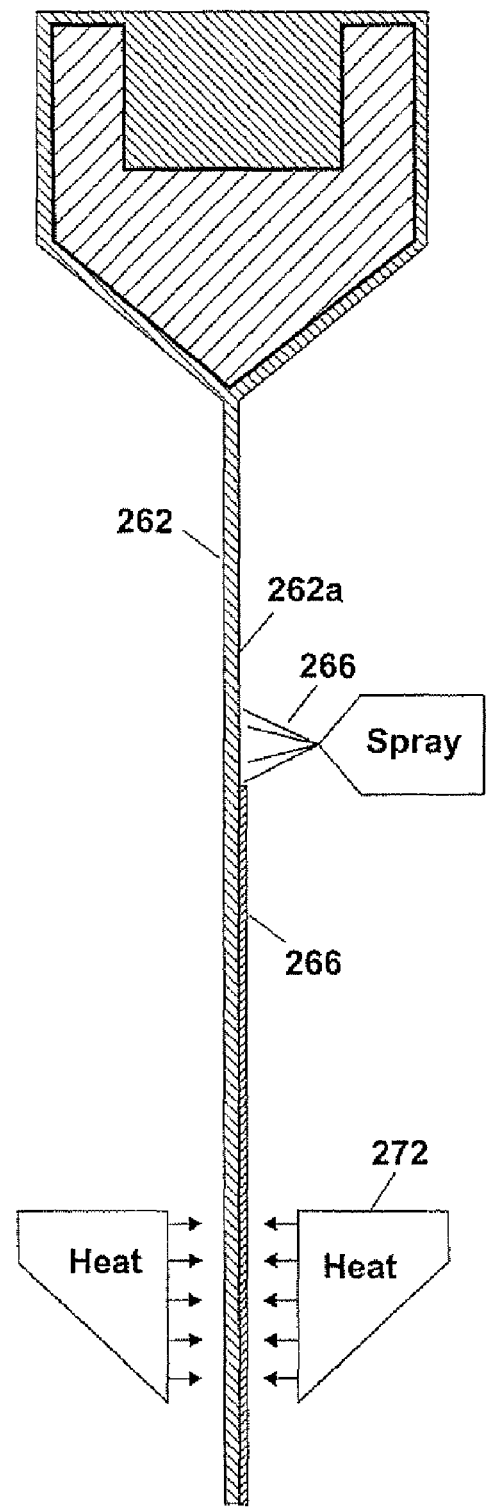
FIG. 21 shows a coating material being sprayed on a fusion-formed surface.

Another method for coating the fusion-formed surface 262a involves spraying the coating material on the fusion-formed surface 262a. FIG. 21 shows the coating material 266 being sprayed on the surface 262a of the sheet-like flow 262. The coating material 266 can be sprayed while drawing down the sheet-like flow 262. If the coating material 266 is a polymer, it can be subsequently cured, as indicated at 272, via radiation, microwave, or heat.

For all the coating methods described above, the sheet-like flow 262 is very reactive when in flowable or molten form, allowing the coating material 266 to form a strong bond with the surface(s) of the sheet-like flow 266 without the use of an adhesive.

Method of Making a Laminated Sheet with a Glass-Ceramic Layer

The methods described above can be used to form a laminated sheet having a glass-ceramic layer with the modification that the nucleating agents for the glass-ceramic layer are introduced to the delivery system at appropriate locations. The nucleating agents can be introduced to the glass delivery system by positioning blocks of consumable material (containing the nucleating agents) at the appropriate locations in the delivery system. In one embodiment, the glass-ceramic layer is a buried within the laminated sheet. A method of forming such a buried laminate will now be described.

Figure 22A:
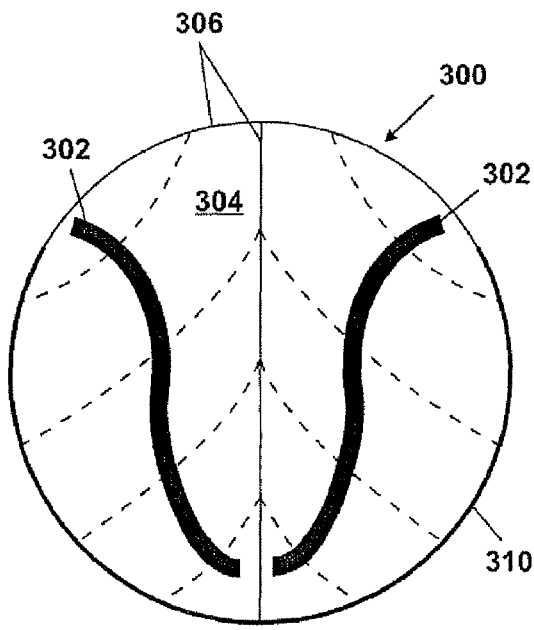
FIGS. 22A and 22B show a mapping of locations in a viscous, flowable material carried through a delivery system to locations in a final sheet formed from the viscous, flowable material.
Figure 22B:
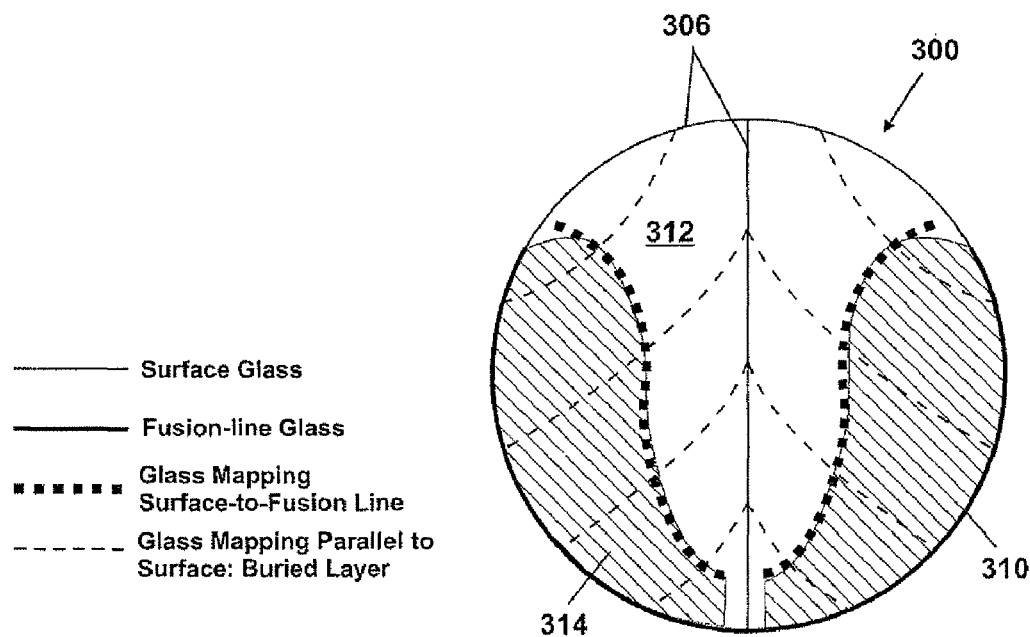

As previously discussed, recent advances in modeling of the fusion process make it possible to map the precise location in the delivery system that ultimately ends up at any location in the finished sheet. FIG. 22A shows an example of such a map. The map 300 indicates where to position blocks of consumable material 302 in a melt 304 to form a desired layered structure. The line 306 demarcates the portion of the melt 304 that will ultimately end up on the surface of the formed sheet. The line 310 demarcates the portion of the melt 304 that will be buried in the formed sheet. FIG. 22B shows a surface glass composition 312 corresponding to the surface layer of the formed sheet and a buried glass composition 314 corresponding to the core layer of the formed sheet.

In operation, a melt having the compositional variation shown in, for example, the map 300 of FIGS. 22A and 22B would be delivered to a double-sided overflow fusion pipe to form a sheet-like flow, as previously described. The final glass sheet would have a buried layer that includes elements from the consumable material. The final glass sheet can then be subjected to a ceraming process to form the buried glass-ceramic layer.

It should be noted that the method described above can generally be used to form a laminated sheet having a buried layer with a composition that is different from the surface layer, where the consumable material is used to introduce the desired compositional variations.

An alternative process for forming a laminated sheet with a glass-ceramic layer involves forming the glass-ceramic layer separately and then using a fusion process to add a surface layer to the glass-ceramic layer in a manner similar to the one described above for the sandwich laminated sheet.

Those skilled in the art will understand that various combinations of the methods described above can be used to form laminated sheets.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making a laminated sheet, comprising:
adding a first surface layer to a previously prepared core layer, the previously prepared core layer comprising a glass material or a foam material that can be expanded, the first surface layer being added by a fusion process comprising:
supplying a first viscous, flowable material to a first overflow channel of a first single-sided overflow fusion pipe;
overflowing the first viscous, flowable material in a controlled manner to form a first sheet-like flow with an untouched surface of fire-polished quality and a touched surface; and
while the first sheet-like flow is in viscous, flowable form, merging the touched surface of the first sheet-like flow with a first surface of the previously prepared core layer.

2. The method of claim 1, wherein the previously prepared core layer has a higher elastic modulus than the first surface layer.

3. The method of claim 1, wherein the fusion process further comprises drawing the merged first sheet-like flow and previously prepared core layer to a desired thickness.

4. The method of claim 3, further comprising adding a second surface layer to the previously prepared core layer, the second surface layer being added by a fusion process comprising supplying a second viscous, flowable material to a second overflow channel of a second single-sided overflow fusion pipe, overflowing the second viscous, flowable material in a controlled manner to form a second sheet-like flow with an untouched surface of fire-polished quality and a touched surface, and, while the second sheet-like flow is in viscous, flowable form, merging the touched surface of the second sheet-like flow with a second surface of the previously prepared core layer.

5. The method of claim 3, further comprising preparing the core layer by subjecting a glass material to annealing prior to the adding step.

6. The method of claim 3, wherein the previously prepared core layer has a higher section modulus than the first surface layer.

7. A method of making a laminated sheet, comprising:
adding a first surface layer to a previously prepared core layer, wherein the previously prepared core layer comprises an annealed glass, the first layer being added by a fusion process comprising:
supplying a first viscous, flowable material to a first overflow channel of a first single-sided overflow fusion pipe;
overflowing the first viscous, flowable material in a controlled manner to form a first sheet-like flow with an untouched surface of fire-polished quality and a touched surface; and
while the first sheet-like flow is in viscous, flowable form, merging the touched surface of the first sheet-like flow with a first surface of the previously prepared core layer.

8. A method of making a laminated sheet, comprising:
adding a first surface layer to a previously prepared core layer, wherein the previously prepared core layer comprises a glass-ceramic, the first layer being added by a fusion process comprising:
supplying a first viscous, flowable material to a first overflow channel of a first single-sided overflow fusion pipe;
overflowing the first viscous, flowable material in a controlled manner to form a first sheet-like flow with an untouched surface of fire-polished quality and a touched surface; and
while the first sheet-like flow is in viscous, flowable form, merging the touched surface of the first sheet-like flow with a first surface of the previously prepared core layer.

* * * * *